(12) United States Patent  
Shimotani et al.

(10) Patent No.: US 9,179,133 B2  
(45) Date of Patent: Nov. 3, 2015

(54) 3DIMENSION STEREOSCOPIC DISPLAY DEVICE

(75) Inventors: Mitsuo Shimotani, Tokyo (JP); Makoto Mikuriya, Tokyo (JP); Takeo Sakairi, Tokyo (JP); Eriko Toma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 382 days.

(21) Appl. No.: 13/702,322

(22) PCT Filed: Oct. 19, 2010

(86) PCT No.: PCT/JP2010/006187  
§ 371 (c)(1),  
(2), (4) Date: Dec. 6, 2012

(87) PCT Pub. No.: WO2012/053030  
PCT Pub. Date: Apr. 26, 2012

(65) Prior Publication Data  
US 2013/0201303 A1    Aug. 8, 2013

(51) Int. Cl.  
*H04N 13/00* (2006.01)  
*H04N 15/00* (2006.01)  
*H04N 13/02* (2006.01)  
*H04N 13/04* (2006.01)  
*G01C 21/36* (2006.01)  
*H04N 9/80* (2006.01)  
*H04N 5/92* (2006.01)  
(Continued)

(52) U.S. Cl.  
CPC .............. *H04N 13/04* (2013.01); *G01C 21/365* (2013.01); *H04N 13/0454* (2013.01); *H04N 13/0497* (2013.01)

(58) Field of Classification Search  
USPC .......... 386/239, 326, 335; 348/42, 43, 51, 44, 348/52  
See application file for complete search history.

(56) References Cited

U.S. PATENT DOCUMENTS

2002/0044349 A1    4/2002   Shinoura  
2006/0050016 A1    3/2006   Tomisawa et al.  
(Continued)

FOREIGN PATENT DOCUMENTS

| JP | 4-255891 A | 9/1992 |
| JP | 5-147456 A | 6/1993 |
| JP | 8-331605 A | 12/1996 |
| JP | 9-113839 A | 5/1997 |
| JP | 11-119147 A | 4/1999 |

(Continued)

OTHER PUBLICATIONS http://ascii.jp/elem/000/000/333/333319/, Sep. 10, 2002.

*Primary Examiner* — Daquan Zhao  
(74) *Attorney, Agent, or Firm* — Birch, Stewart, Kolasch & Birch, LLP

(57) ABSTRACT

Disclosed is a 3Dimension stereoscopic display device including a video image playback device 5 for playing back a right-eye image or video image and a left-eye image or video image for three-dimensional stereoscopic display which are based on an inputted image or video image, a stereoscopic display monitor 6 for producing a three-dimensional stereoscopic display of the right-eye image or video image and the left-eye image or video image and a screen composition processing unit 4 for generating the right-eye image or video image and the left-eye image or video image in which a virtual display surface for three-dimensional stereoscopic display of the image or video image differs from the screen of the stereoscopic display monitor 6, and for outputting the right-eye image or video image and the left-eye image or video image to the video image playback device 5.

15 Claims, 28 Drawing Sheets

(51) Int. Cl.
 *H04N 5/89* (2006.01)
 *H04N 5/84* (2006.01)

(56) References Cited

U.S. PATENT DOCUMENTS

| | | | |
|---|---|---|---|
| 2008/0030428 A1 | 2/2008 | Tomisawa et al. | |
| 2008/0161997 A1* | 7/2008 | Wengelnik et al. | 701/36 |
| 2010/0226628 A1* | 9/2010 | Yamaji et al. | 386/108 |
| 2011/0013890 A1* | 1/2011 | Sasaki et al. | 386/357 |
| 2011/0093778 A1* | 4/2011 | Kim et al. | 715/702 |

FOREIGN PATENT DOCUMENTS

| | | |
|---|---|---|
| JP | 2001-356299 A | 12/2001 |
| JP | 2003-280812 A | 10/2003 |
| JP | 2004-280496 A | 10/2004 |
| JP | 2005-175566 A | 6/2005 |
| JP | 2005-301144 A | 10/2005 |
| JP | 2007-292956 A | 11/2007 |
| JP | 2008-538037 A | 10/2008 |
| WO | WO 2004/038486 A1 | 5/2004 |
| WO | WO 2006/035816 A1 | 4/2006 |
| WO | WO 2006/061959 A1 | 6/2006 |

* cited by examiner (b)

3DIMENSION STEREOSCOPIC DISPLAY DEVICE

FIELD OF THE INVENTION

The present invention relates to a 3Dimension stereoscopic display device which displays a 3Dimension stereoscopic image or a 3Dimension stereoscopic movie.

BACKGROUND OF THE INVENTION

A conventional stereoscopic display device disclosed by patent reference 1 provides a 3Dimension stereoscopic image mainly intended for home use. Because this stereoscopic display device enables the user to watch a 3Dimension stereoscopic movie without wearing stereoscopic vision glasses, the stereoscopic display device offers high convenience to the user. For example, the stereoscopic display device is suitable for use as a content playback device for the front seat and an RSE (Rear Seat Entertainment) display for rear seats.

RELATED ART DOCUMENT

Patent Reference

Patent reference 1: Japanese Unexamined Patent Application Publication No. 2005-175566

SUMMARY OF THE INVENTION

However, when applying such a conventional technology as represented by patent reference 1 to a display device for displaying in-vehicle information for the driver or a meter panel, the conventional technology cannot be used just as it is unless a safety measure is taken. For example, because a 3Dimension stereoscopic movie having movements or a 3Dimension stereoscopic image or 3Dimension stereoscopic movie bristling with stereoscopically displayed ground objects located disorderly such as buildings which is provided for the driver while driving the vehicle impairs the visibility of the screen instead, a safety measure must be taken. In addition, the patent reference does not disclose any method of producing a display of a 3Dimension stereoscopic image which is suitable for provision of information for the driver while driving the vehicle, thereby improving the safety and the visibility of the screen.

The present invention is made in order to solve the above-mentioned problem, and it is therefore an object of the present invention to provide a 3Dimension stereoscopic display device which can improve the visibility of a 3Dimension stereoscopic image or a 3Dimension stereoscopic movie by changing the distance of a virtual 3Dimension stereoscopic display surface from the display screen of the 3Dimension stereoscopic display device or by turning the virtual 3Dimension stereoscopic display surface in a direction in which the user easily views the 3Dimension stereoscopic image or the 3Dimension stereoscopic movie.

In accordance with the present invention, there is provided a 3Dimension stereoscopic display device including: a playback processing unit for playing back a right-eye image or video image and a left-eye image or video image for three-dimensional stereoscopic display of an inputted image or video image which is a display object which is a planar image or an image in which a stereoscopic image is displayed on a planar image; a stereoscopic display monitor unit for producing a three-dimensional stereoscopic display of the right-eye image or video image and the left-eye image or video image for three-dimensional stereoscopic display of the inputted image or video image which is the display object, which are played back by the playback processing unit; and a screen composition processing unit for generating the right-eye image or video image and the left-eye image or video image for three-dimensional stereoscopic display in which a virtual display surface for three-dimensional stereoscopic display of the image or video image which is the display object differs from a screen of the stereoscopic display monitor unit, and for outputting the right-eye image or video image and the left-eye image or video image to the playback processing unit, wherein the screen composition processing unit generates the right-eye image or video image and the left-eye image or video image for three-dimensional stereoscopic display in which the virtual display surface for three-dimensional stereoscopic display of the image or video image which is the display object is set to be placed at a position backward with respect to the screen of the stereoscopic display monitor unit.

By changing the distance from the display screen of the 3Dimension stereoscopic display device to the virtual 3Dimension stereoscopic display surface, or turning the virtual 3Dimension stereoscopic display surface in a direction which makes the user easily view the 3Dimension stereoscopic image or the 3Dimension stereoscopic movie, the 3Dimension stereoscopic display device in accordance with the present invention provides an advantage of being able to improve the visibility of the 3Dimension stereoscopic image or the 3Dimension stereoscopic movie.

BRIEF DESCRIPTION OF THE FIGURES

FIG. 5-1 is a view for explaining a coordinate system in which a relationship between the display position and the screen shown in FIG. 5 is defined;

EMBODIMENTS OF THE INVENTION

Hereafter, in order to explain this invention in greater detail, the preferred embodiments of the present invention will be described with reference to the accompanying drawings.

Embodiment 1

Figure 1:
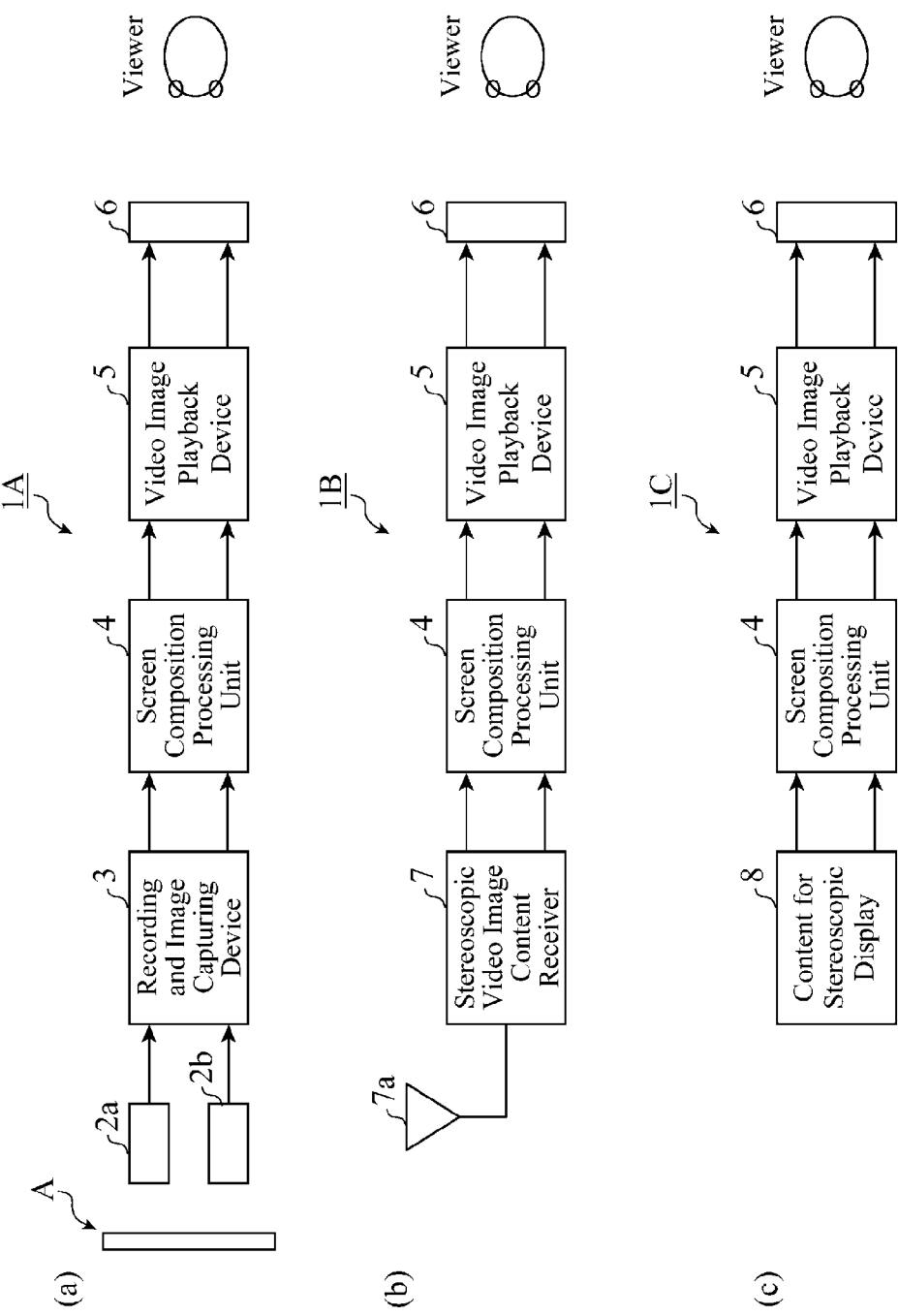
FIG. 1 is a block diagram showing an example of the structure of a stereoscopic display system using a 3Dimension stereoscopic display device in accordance with the present invention.

FIG. 1 is a block diagram showing an example of the structure of a stereoscopic display system which uses a 3Dimension stereoscopic display device in accordance with the present invention. FIG. 1(a) shows the stereoscopic display system 1A which displays a 3D video image on the basis of right and left video images captured using cameras for both eyes. Referring to FIG. 1(a), the stereoscopic display system 1A is provided with a left-eye camera 2a, a right-eye camera 2b, a recording and image capturing device 3, a screen composition processing unit 4, a video image playback device 5, and a stereoscopic display monitor (stereoscopic display monitor unit) 6. The left-eye camera 2a and the right-eye camera 2b are arranged at an interval which takes into consideration the parallax difference between the two eyes, and capture a scene A which is an object to be captured under control of the recording and image capturing device 3. Right and left video data about the scene A captured by the left-eye camera 2a and the right-eye camera 2b are recorded in the recording and image capturing device 3. The screen composition processing unit 4 carries out a 3Dimension stereoscopic movie compositing process on the right and left video data read from the recording and image capturing device 3, the 3Dimension stereoscopic movie composite process being specific to the present invention, and outputs the right and left video data processed thereby to the video image playback device 5. The video image playback device 5 plays back the right and left video data processed by the screen composition processing unit 4, and then outputs the right and left video data played back thereby to the stereoscopic display monitor 6. The stereoscopic display monitor 6 displays the right and left video data played back by the video image playback device 5 in a stereoscopic manner when viewed from a viewer.

A stereoscopic display system 1B shown in FIG. 1(b) is provided with a stereoscopic video image content receiver 7 which communicates with an external device via an antenna 7a, an image composition processing unit 4, a video image playback device 5, and a stereoscopic display monitor 6. The stereoscopic video image content receiver 7 receives a stereoscopic video image content including right and left video data as mentioned above from the external device via the antenna 7a. The screen composition processing unit 4 carries out a 3Dimension stereoscopic movie compositing process on the right and left video data included in the stereoscopic video image content received by the stereoscopic video image content receiver 7, the 3Dimension stereoscopic movie compositing process being specific to the present invention, and outputs the right and left video data processed thereby to the video image playback device 5. The stereoscopic display monitor 6 displays the right and left video data played back by the video image playback device 5 in a stereoscopic manner when viewed from a viewer, like that shown in FIG. 1(a).

A stereoscopic display system 1C shown in FIG. 1(c) is provided with a storage unit 8 for storing a content for stereoscopic display, an image composition processing unit 4, a video image playback device 5, and a stereoscopic display monitor 6. The content for stereoscopic display is content data including right and left video data as mentioned above. As the storage unit 8, an HDD (Hard Disk Drive) or a semiconductor memory for storing the content for stereoscopic display can be provided. As an alternative, a drive device for playing back a memory medium, such as a CD or a DVD, for storing the content for stereoscopic display can be provided.

The screen composition processing unit 4 carries out a 3Dimension stereoscopic movie compositing process on the right and left video data in the content for stereoscopic display read from the storage unit 8, the 3Dimension stereoscopic movie compositing process being specific to the present invention, and outputs the right and left video data processed thereby to the video image playback device 5. The stereoscopic display monitor 6 displays the right and left video data played back by the video image playback device 5 in a stereoscopic manner when viewed from a viewer, like that shown in FIG. 1(a). So-called three-dimensional data (e.g. three-dimensional map data) can be stored as the content for stereoscopic display, and the screen composition processing unit 4 can compute how the image shown by this three-dimensional data appears from each of the left and right points of view to generate right and left video data.

Figure 2:
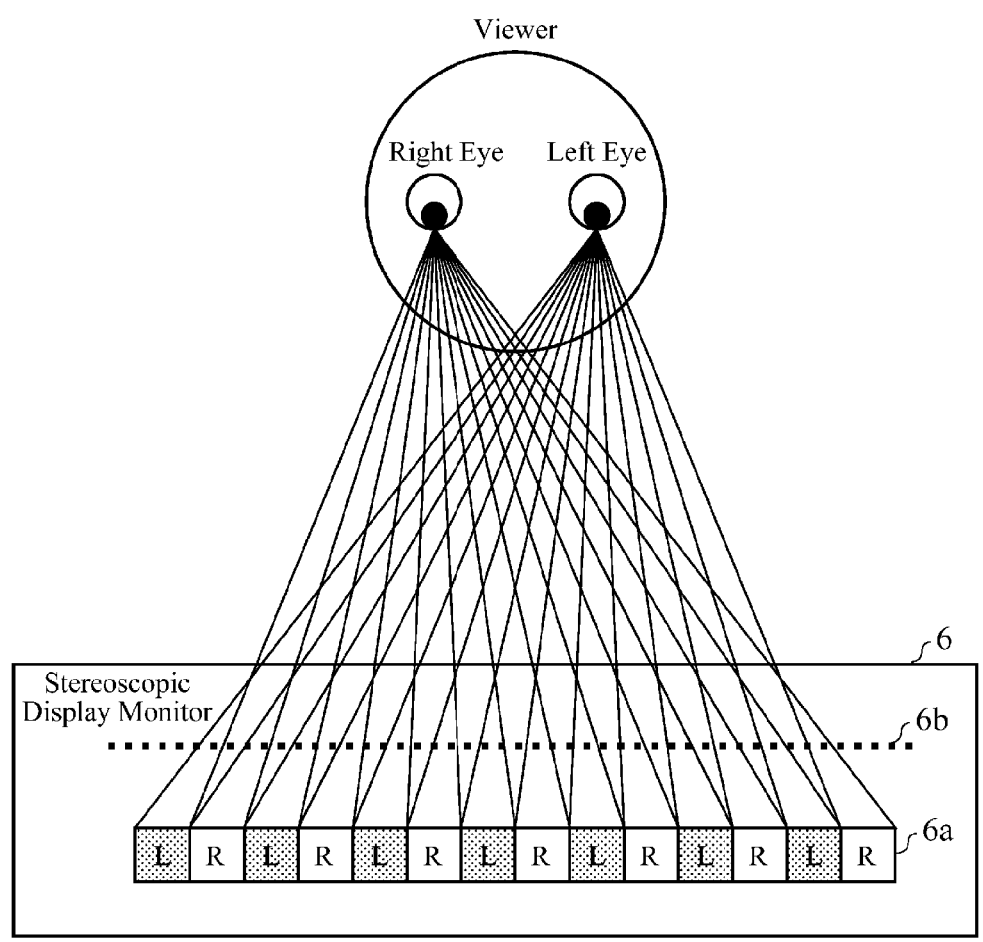
FIG. 2 is a view for explaining the principle behind a stereoscopic display in a stereoscopic display monitor.

FIG. 2 is a view for explaining the principle behind a stereoscopic display produced by the stereoscopic display monitor, and shows an example of a stereoscopic display intended for the naked eye. The stereoscopic display monitor 6 shown in FIG. 2 is provided with a liquid crystal display element group 6a and a parallax barrier unit 6b. The liquid crystal display element group 6a has a liquid crystal element group for right eyes which provides directivity for causing a right-eye video image to reach a right eye, and a liquid crystal element group for left eyes which provides directivity for causing a left-eye video image to reach a left eye. The parallax barrier unit 6b is a visual field barrier for blocking light from a backlight (not shown in FIG. 2) in order to alternately display the right-eye video image and the left-eye video image.

A video signal for left eyes (L) and a video signal for right eyes (R) which the video image playback device 5 generates by playing back the right and left video data are alternately inputted to the stereoscopic display monitor 6 in order of L, R, L, R, and . . . . When receiving the video signal for left eyes (L), the liquid crystal display element group 6a operates the liquid crystal element group for left eyes, whereas when receiving the video signal for right eyes (R), the liquid crystal display element group 6a operates the liquid crystal element group for right eyes. The parallax barrier unit 6b blocks the light emitted from the backlight and passing through the liquid crystal display element group for right eyes at the time that the liquid crystal element group for left eyes operates, whereas the parallax barrier unit 6b blocks the light emitted from the backlight and passing through the liquid crystal display element group for left eyes at the time that the liquid crystal element group for right eyes operates. As a result, the right-eye video image and the right-eye video image are displayed alternately on the screen of the stereoscopic display monitor 6, so that a viewer can watch the stereoscopic video image at his or her point of view shown in FIG. 2.

The present invention is not limited to the stereoscopic display monitor 6 having the structure shown in FIG. 2, and a monitor which implements stereoscopic vision by using another mechanism can be alternatively used. For example, a method of providing a stereoscopic image by causing a viewer to wear glasses having left and right lenses to which different polarizing plates are attached as exclusive glasses can be used.

Figure 3:
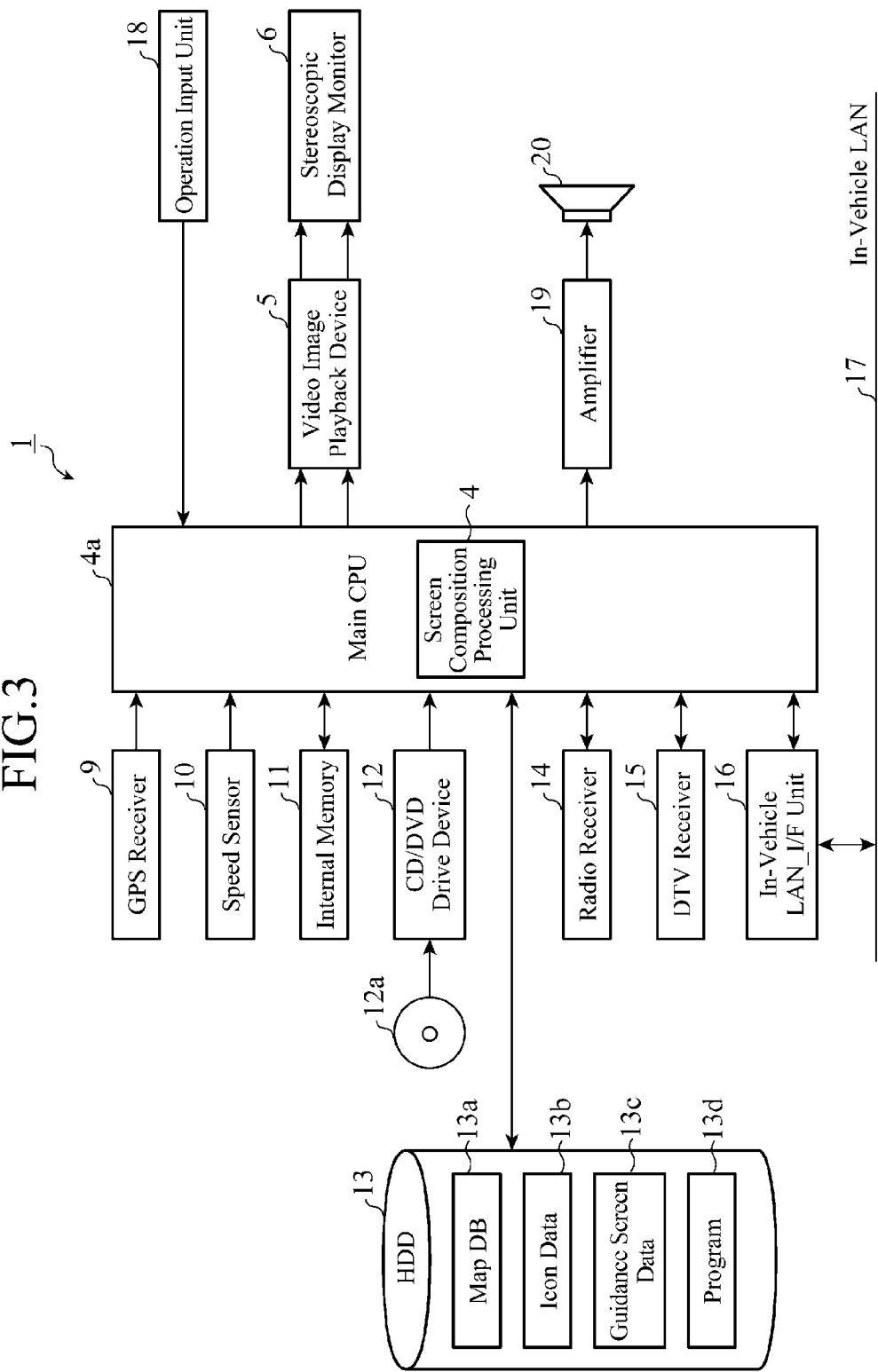
FIG. 3 is a block diagram showing the structure of an in-vehicle information system which uses the 3Dimension stereoscopic display device in accordance with Embodiment 1 of the present invention.

FIG. 3 is a block diagram showing the structure of an in-vehicle information system which uses the 3Dimension stereoscopic display device in accordance with Embodiment 1 of the present invention. In the example shown in FIG. 3, the in-vehicle information system 1 functions as a stereoscopic display system shown in FIG. 1, regarding a display of an image, such as a map or a video image. Further, the in-vehicle information system 1 is provided with a main CPU 4a, a video image playback device 5, a stereoscopic display monitor 6, a GPS (Global Positioning System) receiver 9, a speed sensor 10, an internal memory 11, a CD/DVD drive device 12, an HDD 13, a radio receiver 14, a DTV receiver 15, an in-vehicle LAN_I/F unit 16, an operation input unit 18, an amplifier 19, and a speaker 20.

The main CPU 4a controls each component disposed in the in-vehicle information system 1. This main CPU 4a functions as the screen composition processing unit 4 shown in FIG. 1 by executing a program 13d (application program for in-vehicle information processing) stored in the HDD 13. The video image playback device 5 plays back the right and left video data on which the screen composition processing unit 4 of the main CPU 4a has carried out a compositing process, and outputs the right and left video data played back thereby to the stereoscopic display monitor 6. Further, the stereoscopic display monitor 6 displays the right and left video data played back by the video image playback device 5 in a stereoscopic manner when viewed from a viewer.

The GPS receiver 9 receives the position information about the position of the vehicle from GPS satellites, and the speed sensor 10 detects vehicle speed pulses for calculating the vehicle speed of the vehicle. The internal memory 11 serves as a work area when the main CPU 4a executes the application program for in-vehicle information processing. The CD/DVD drive device 12 plays back an AV source stored in a memory medium 12a, such as a CD or DVD. When stereoscopic display video data are included in an AV source stored in the memory medium 12a, the CD/DVD drive device functions as the stereoscopic video image content receiver 7 shown in FIG. 1(b), and the in-vehicle information system 1 functions as the stereoscopic display system 1B shown in FIG. 1(b).

The HDD (hard disk drive) 13 is a mass storage device mounted in the in-vehicle information system 1, and stores a map database (abbreviated as a map DB hereafter) 13a, icon data 13b, guidance screen data 13c, and a program 13d. The map DB 13a is a database in which map data for use in navigation processing are registered. POI information in which the locations of POIs (Points Of Interest) on a map or detailed information associated with these POIs are described is also included in the map data. The icon data 13b show icons which are to be displayed on the screen of the stereoscopic display monitor 6. The icon data include icons showing operation buttons used for enabling the user to carry out various operations on the screen, etc. The guidance screen data 13c show a guidance screen on which a route along which the vehicle should travel when the in-vehicle information system carries out the navigation processing is described. The program 13d is an application program for in-vehicle information processing which the main CPU 4a executes. For example, the program has an application program for map display including a program module for implementing the functions of the screen compositing process unit 4.

The radio receiver 14 receives a radio broadcast, and makes a channel selection according to, for example, an operation on a not-shown button selector. The DTV receiver 15 receives a digital television broadcast, and makes a channel selection according to an operation on a not-shown button selector, like the radio receiver 14. The DTV receiver 15 also functions as the stereoscopic video image content receiver 7 shown in FIG. 1(b) when 3Dimension stereoscopic display video data are included in a digital television broadcast received thereby, and the in-vehicle information system 1 functions as the stereoscopic display system 1B shown in FIG. 1(b).

The in-vehicle LAN_I/F unit 16 is an interface between an in-vehicle LAN (Local Area Network) 17 and the main CPU 4a, and relays data communications between, for example, other equipment connected to the in-vehicle LAN 17, and the main CPU 4a. Further, the storage unit 8 shown in FIG. 1(c) is connected to the in-vehicle LAN 17, and, when the in-vehicle LAN_I/F unit 16 is regarded as a component for relaying between this storage unit 8 and the screen compositing process unit 4 of the main CPU 4a, the in-vehicle information system 1 functions as the stereoscopic display system 1C shown in FIG. 1(c).

The operation input unit 18 is a component for enabling the user to perform an operational input. As this operation input unit 18, a key switch (operation switch) disposed in the vicinity of the screen of the stereoscopic display monitor 6 can be provided, for example. In a case in which a touch panel is disposed on the screen of the stereoscopic display monitor 6, the touch switch or a remote control can be provided as the operation input unit 18.

Sound signals played back by the CD/DVD drive device 12, the radio receiver 14, and the DTV receiver 15 and a sound signal from the main CPU 4a are amplified by the amplifier 19, and a sound is outputted via the speaker 20. As the sound signal from the main CPU 4a, there is a route guidance voice signal generated through the navigation processing, for example.

Next, the operation of the 3Dimension stereoscopic display device will be explained. When displaying a planar image, the 3Dimension stereoscopic display device in accordance with Embodiment 1 composites images into a 3Dimension stereoscopic image in which the virtual display position of the planar image is placed at a position forward or backward with respect to the screen of the stereoscopic display monitor 6, and displays the 3Dimension stereoscopic image in a stereoscopic manner. For example, when displaying a planar image in a map display of the in-vehicle navigation device, the 3Dimension stereoscopic display device places the virtual display position of the planar map at a position backward with respect to the screen of the stereoscopic display monitor 6 (i.e. a position farther away from the driver than the screen). In this case, the difference in focus distance between the focus position at which the road scene ahead of the vehicle at which the driver is looking while driving the vehicle is located, and the virtual display position of the planar map can be lessened. More specifically, the distance of the focus point movement when the driver looking at the road scene ahead of the vehicle moves his or her line of sight to the map image displayed on the stereoscopic display monitor 6 disposed in the vehicle can be reduced, so that the driver is enabled to look at the map without having a feeling that something is wrong. By doing in this way, the 3Dimension stereoscopic display device can not only make the map displayed in a stereoscopic manner more legible to the driver, but also improve the safety at the time that the driver looks at the on-screen map.

Figure 4:
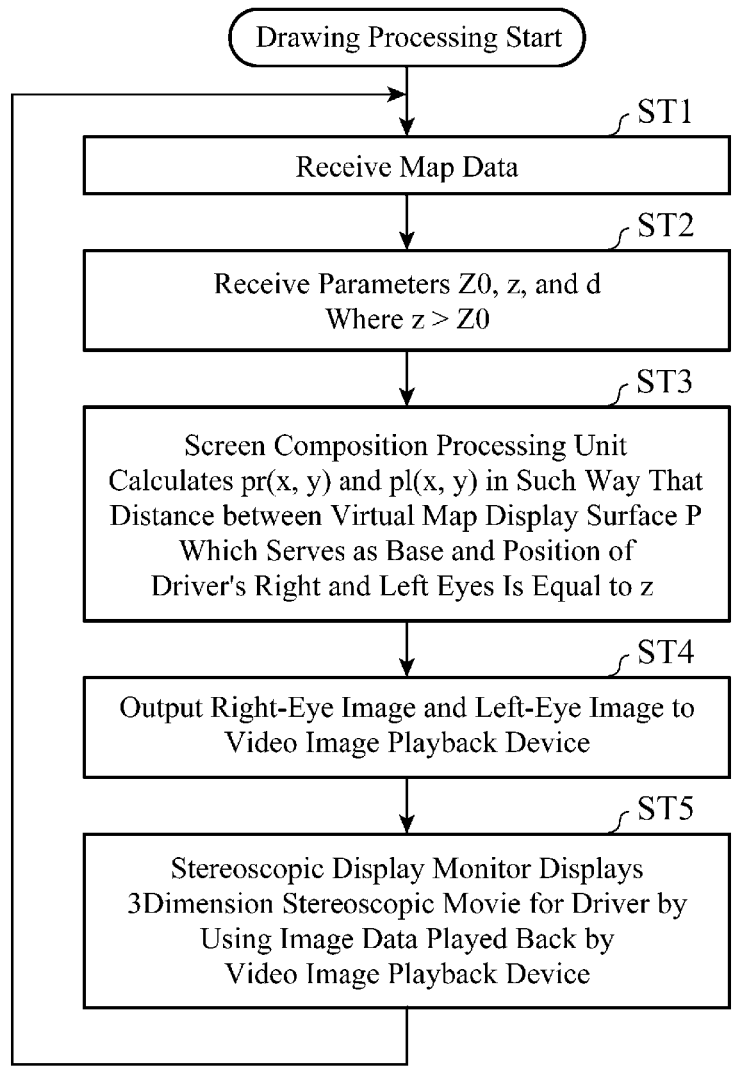
FIG. 4 is a flow chart showing a flow of a screen compositing process carried out by the 3Dimension stereoscopic display device in accordance with Embodiment 1.
Figure 5:
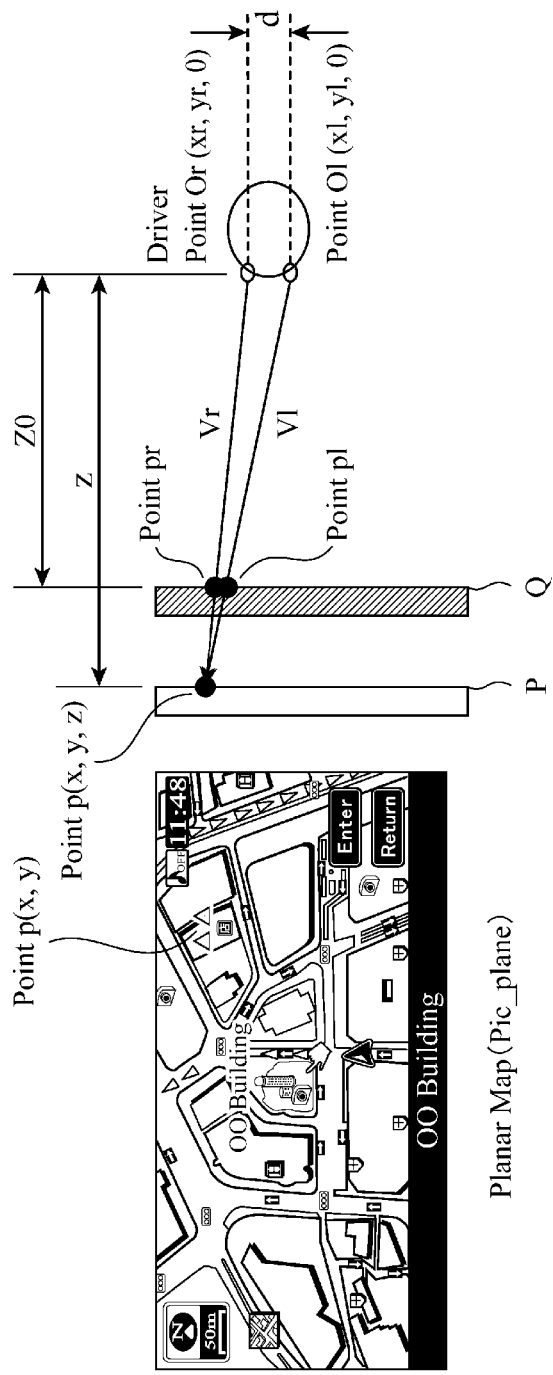
FIG. 5 is a view for explaining a screen compositing process of placing a virtual display position of a planar map at a position backward with respect to the screen of a stereoscopic display monitor.
Figures 1, 5:
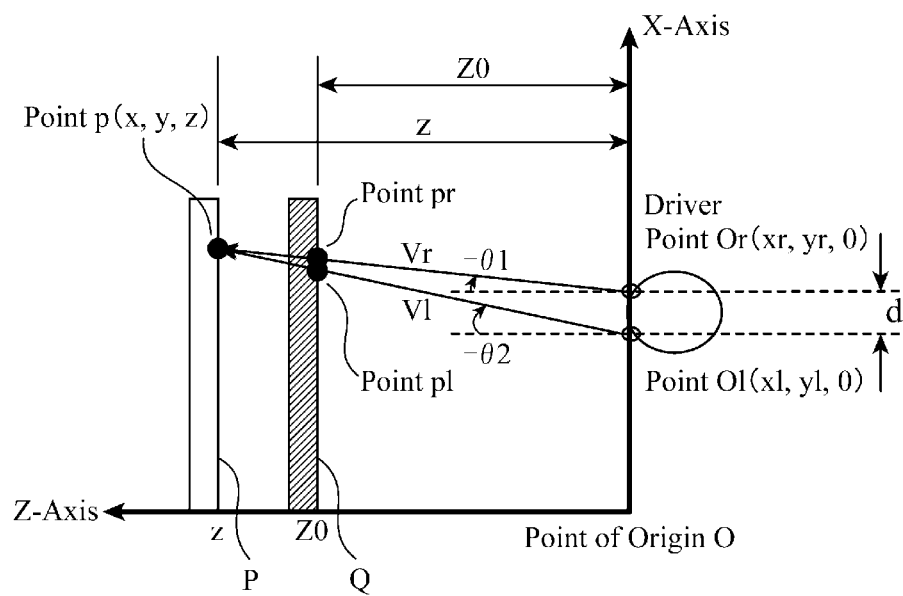
Figure 6:
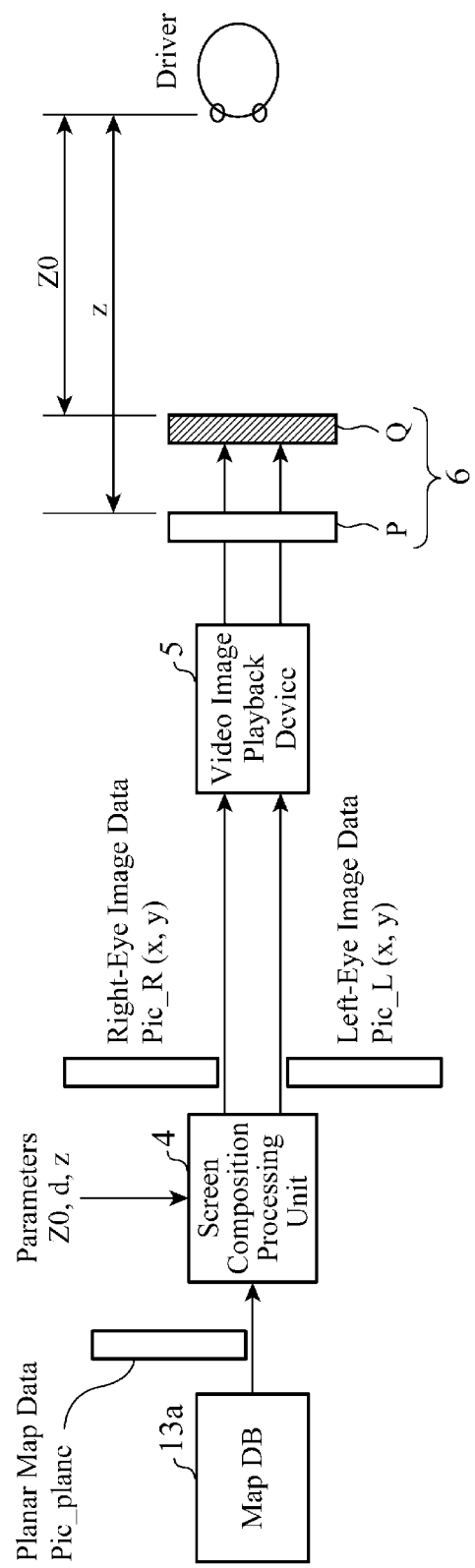
FIG. 6 is a view showing a data flow in the screen compositing process shown in FIG. 5.

FIG. 4 is a flow chart showing a flow of the screen compositing process carried out by the 3Dimension stereoscopic display device in accordance with Embodiment 1, and shows the process of placing the virtual display position of a planar map at a position backward with respect to the screen of the stereoscopic display monitor 6. Further, FIG. 5 is a view for explaining the screen compositing process of placing the virtual display position of a planar map at a position backward with respect to the screen of the stereoscopic display monitor. FIG. 6 is a view showing a data flow in the screen compositing process shown in FIG. 5. Hereafter, the details of the screen compositing process will be explained with reference to FIG. 4, and FIGS. 5 and 6 will be referred to as needed.

First, the main CPU 4a reads map data from the map DB 13a stored in the HDD 13, and generates planar map data Pic_plane according to a predetermined map drawing algorithm, as shown in FIG. 6. For example, the planar map data Pic_plane are the one about a planar map which is described in a left part of FIG. 5.

In the example of FIG. 5, the planar map shown by the planar map data Pic_plane is displayed on the virtual map display surface P placed at a position backward with respect to the screen Q of the stereoscopic display monitor 6. Hereafter, the distance from the position of the driver's eyes to the screen Q of the stereoscopic display monitor 6 is expressed as Z0, and the distance from the position of the driver's eyes to the virtual map display surface P is expressed as z. In the example of FIG. 5, the following relationship: z>Z0 is established.

FIG. 5-1 is a view for explaining a coordinate system in which the relationship between the display position and the screen shown in FIG. 5 is defined. In FIGS. 5 and 5-1, the position of the driver's right eye is expressed as a point Or(xr, yr, 0), the position of the driver's left eye is expressed as a point Ol(xl, yl, 0), and the gap between the left and right eyes is expressed as d. That is, the following relationship: xr−xl=d is established. Further, the following relationship: yr=yl is established generally. The projection of a point p(x, y) on the planar map shown by the planar map data Pic_plane onto the virtual map display surface P yields a point p(x, y, z) on the map display surface P.

Right-eye image data Pic_R(x, y) of the planar map are expressed by a set of points pr at each of which a straight line (vector Vr) which connects between the point p(x, y, z) on the virtual map display surface P and the point Or(xr, yr, 0) which is the position of the right eye intersects the screen Q of the stereoscopic display monitor 6. In this case, when the counter-clockwise angle which the sight line direction of the driver's right eye forms with the normal direction of the screen Q is expressed as θ1, the coordinates of the point pr are shown by (xr−Z0 tan θ1, yr, Z0).

Similarly, left-eye image data Pic_L(x, y) of the planar map are expressed by a set of points pl at each of which a straight line (vector Vl) which connects between the point p(x, y, z) on the virtual map display surface P and the point Ol(xl, yl, 0) which is the position of the left eye intersects the screen Q of the stereoscopic display monitor 6. In this case, when the counter-clockwise angle which the sight line direction of the driver's left eye forms with the normal direction of the screen Q is expressed as θ2, the coordinates of the point pl are shown by (xl−Z0 tan θ2, yl, Z0).

The screen composition processing unit 4 receives the planar map data Pic_plane which are generated as above (step ST1), and also receives the parameters Z0, z, and d (step ST2). Next, the screen composition processing unit 4 calculates the points pr and pl in such a way that the distance between the virtual map display surface P and the position of the driver's right and left eyes is equal to z by using the planar map data Pic_plane and the parameters Z0, z, and d inputted thereto to generate right-eye image data Pic_R(x, y) and left-eye image data Pic_L(x, y) (step ST3). The screen composition processing unit 4 then outputs the right-eye image data Pic_R(x, y) and the left-eye image data Pic_L(x, y) which are generated thereby to the video image playback device 5 (step ST4).

The video image playback device 5 plays back the right-eye image data Pic_R(x, y) and the left-eye image data Pic_L(x, y) which are generated by the screen composition processing unit 4, and outputs them to the stereoscopic display monitor 6. The stereoscopic display monitor 6 displays the planar map in a stereoscopic manner by using the right-eye image data Pic_R(x, y) and the left-eye image data Pic_L(x, y) which are played back by the video image playback device 5 (step ST5). At this time, the 3Dimension stereoscopic display device makes the planar map look as if it is displayed on the virtual map display surface P placed at a position backward with respect to the screen Q of the stereoscopic display monitor 6 when viewed from the driver's position by using stereoscopic vision.

By repeatedly carrying out the process shown in FIG. 4 on the planar map data which are continuously updated as the vehicle travels, the 3Dimension stereoscopic display device can provide a 3Dimension stereoscopic movie in which the planar map is displayed in a continuous manner.

Further, by placing the virtual map display screen P of a planar map at a position forward with respect to the screen Q of the stereoscopic display monitor 6 (i.e. at a position closer to the driver than the screen) when displaying the planar map in the in-vehicle navigation device, the 3Dimension stereoscopic display device makes the planar map look as if it is floating from the screen Q of the stereoscopic display monitor 6 with respect to the driver's position by using stereoscopic vision.

Figure 7:
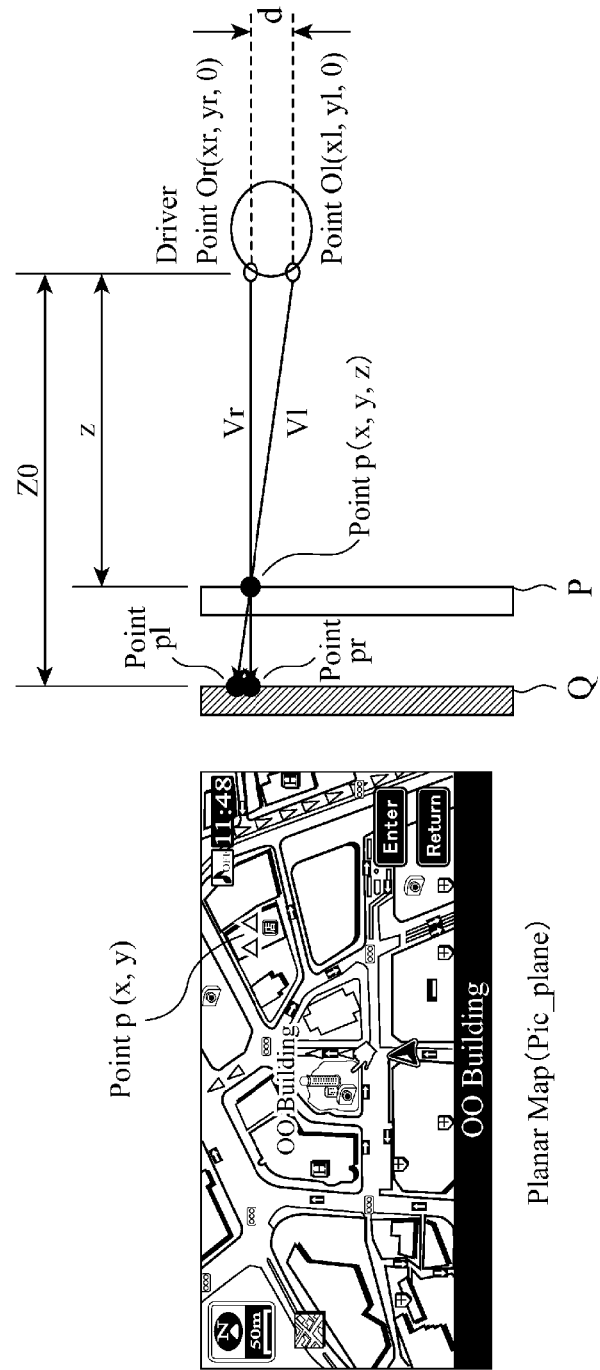
FIG. 7 is a view for explaining a screen compositing process of placing a virtual display position of a planar map at a position forward with respect to the screen of the stereoscopic display monitor.
Figure 8:
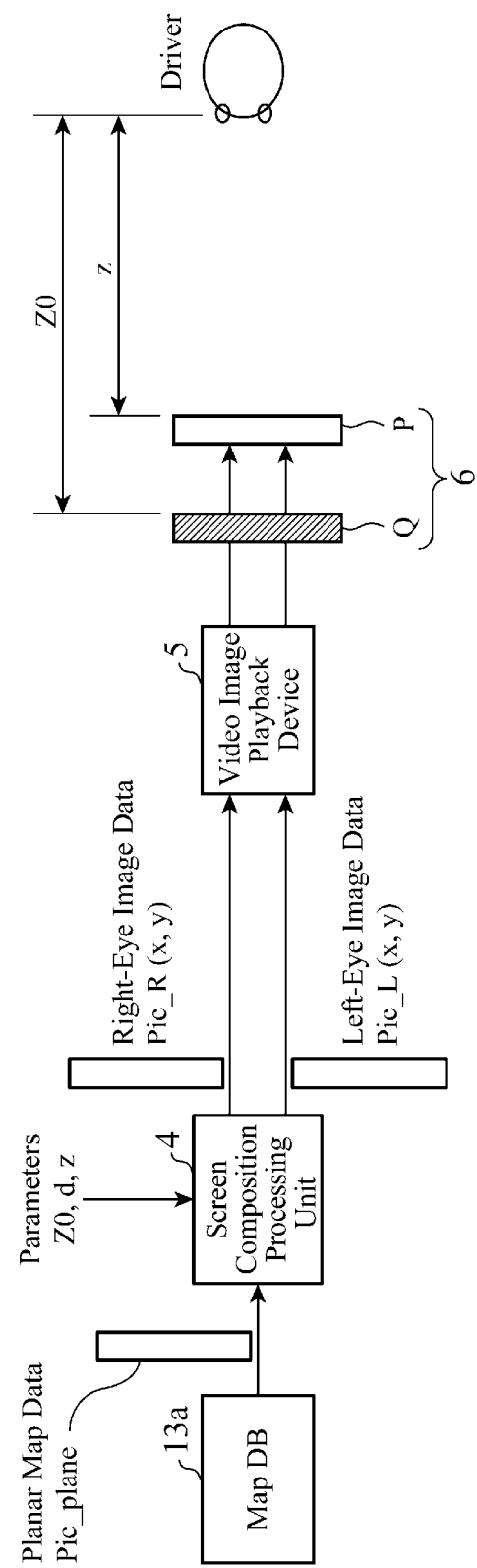
FIG. 8 is a view showing a data flow in the screen compositing process shown in FIG. 7.

FIG. 7 is a view for explaining the screen compositing process of placing the virtual display position of a planar map at a position forward with respect to the screen of the stereoscopic display monitor. FIG. 8 is a view showing a data flow in the screen compositing process shown in FIG. 7. In the example of FIG. 7, the following relationship: z<Z0 is established. In FIG. 7, the position of the driver's left eye is expressed as a point Ol(xl, yl, 0), the position of the driver's right eye is expressed as a point Or(xr, yr, 0), and the gap between the left and right eyes is expressed as d, like in FIG. 5. The projection of a point p(x, y) on the planar map shown by the planar map data Pic_plane onto the virtual map display surface P yields a point p(x, y, z) on the map display surface P.

Right-eye image data Pic_R(x, y) of the planar map are expressed by a set of points pr at each of which an extension (vector Vr) of a straight line which connects between the point p(x, y, z) on the virtual map display surface P and the point Or(xr, yr, 0) which is the position of the right eye intersects the screen Q of the stereoscopic display monitor 6. In this case, when the angle which the sight line direction of the driver's right eye forms with the normal direction of the screen Q is expressed as θ1, the coordinates of the point pr are shown by (xr−Z0 tan θ1, yr, Z0).

Similarly, left-eye image data Pic_L(x, y) of the planar map are expressed by a set of points pl at each of which an extension (vector Vl) of a straight line which connects between the point p(x, y, z) on the virtual map display surface P and the point Ol(xl, yl, 0) which is the position of the left eye intersects the screen Q of the stereoscopic display monitor 6. In this case, when the angle which the sight line direction of the driver's left eye forms with the normal direction of the screen Q is expressed as θ2, the coordinates of the point pl are shown by (xl−Z0 tan θ2, yl, Z0).

By carrying out the same processing as that shown in the above-mentioned flow, the 3Dimension stereoscopic display device displays the planar map on the screen of the stereoscopic display monitor 6. At this time, when z<Z0, the 3Dimension stereoscopic display device makes the planar map shown by the planar map data Pic_plane look as if it is displayed on the virtual map display surface P placed at a position forward with respect to the screen Q of the stereoscopic display monitor 6 when viewed from the driver's position by using stereoscopic vision (refer to FIG. 7).

Further, by carrying out the screen compositing process with the following relationship: z=Z0, the 3Dimension stereoscopic display device makes the planar map look as if the virtual map display surface P coincides with the screen Q of the stereoscopic display monitor 6, and the planar map is displayed on the screen Q. In contrast, by carrying out the screen compositing process with the following relationship: z>Z0, the 3Dimension stereoscopic display device makes the planar map look as if it is displayed on the virtual map display surface P placed at a position backward with respect to the screen Q of the stereoscopic display monitor 6 (i.e. at a position farther away from the driver than the screen) when viewed from the driver's position by using stereoscopic vision (refer to FIG. 5).

Figure 9:
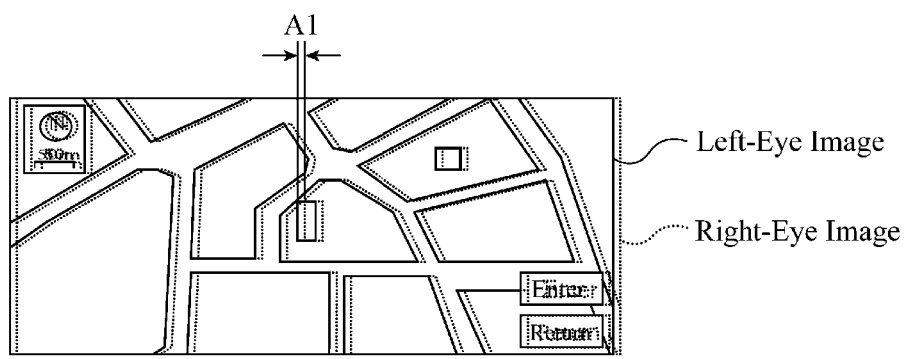
FIG. 9 is a view showing an example of a stereoscopic display produced by the 3Dimension stereoscopic display device in accordance with Embodiment 1.
Figure 9:
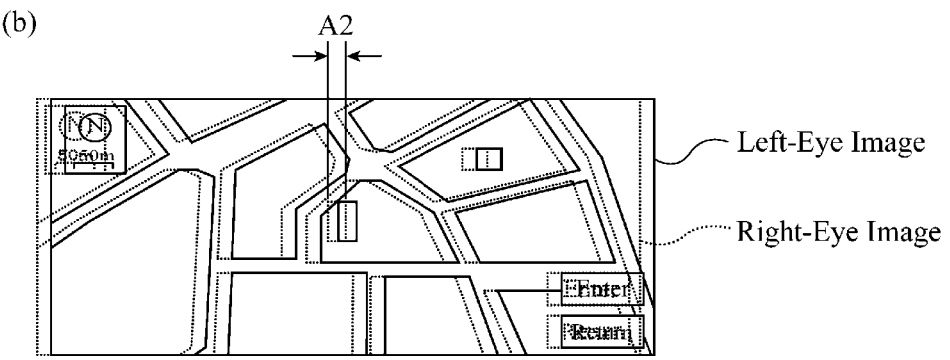

FIG. 9 is a view showing an example of the stereoscopic display produced by the 3Dimension stereoscopic display device in accordance with Embodiment 1. FIG. 9(a) shows the case of z>Z0, and FIG. 9(b) shows the case of z<Z0. In the case of z>Z0 shown in FIG. 9(a), i.e. in the case in which the virtual map display surface P of the planar map is placed at a position backward with respect to the screen Q of the stereoscopic display monitor 6 (i.e. at a position farther away from the driver than the screen), the gap between the left-eye image and the right-eye image is expressed as A1. In this case, the right-eye image is displayed on a right-hand side of the screen. Further, in the case of z<Z0 shown in FIG. 9(b), i.e. in the case in which the virtual map display surface P of the planar map is placed at a position forward with respect to the screen Q of the stereoscopic display monitor 6 (i.e. at a position closer to the driver than the screen), the gap between the left-eye image and the right-eye image is expressed as A2. In this case, the right-eye image is displayed on a left-hand side of the screen. In the case of FIG. 9(a), the 3Dimension stereoscopic display device makes the planar map look as if it is focused at a position farther away from the driver than the screen Q of the stereoscopic display monitor 6 by using stereoscopic vision. Further, in the case of FIG. 9(b), the 3Dimension stereoscopic display device makes the planar map look as if it is floating closer to the driver than the screen Q of the stereoscopic display monitor 6 by using stereoscopic vision.

The screen composition processing unit 4 can change the distance z from the position of the driver's eyes to the virtual map display surface P according to the vehicle speed of the vehicle from the speed sensor 10. For example, while the vehicle is at rest, the 3Dimension stereoscopic display device displays the planar map at a closer position than the screen when viewed from the driver's position. More specifically, the 3Dimension stereoscopic display device displays the planar map in such a way that the planer map looks as if it is floating from the screen Q of the stereoscopic display monitor 6.

On the other hand, the screen composition processing unit 4 increases the distance z with increase in the vehicle speed. At this time, as the vehicle speed increases, the position where the planar map is displayed in a stereoscopic manner is moved to a position farther away from the driver. When the vehicle speed exceeds a predetermined threshold, the following relationship: z>Z0 is established, and the 3Dimension stereoscopic display device causes the planar map to be displayed in such a way as to be focused at a position farther way from the driver than the screen Q of the stereoscopic display monitor 6 by using stereoscopic vision. More specifically, z can be expressed by a function z=f(V) of the vehicle speed, where V is the vehicle speed. By doing in this way, the 3Dimension stereoscopic display device can reduce the difference in focus distance length between the focus position at which the road scene ahead of the vehicle at which the driver is looking while driving the vehicle is located, and the virtual display position of the planar map according to the vehicle speed of the vehicle. As a result, the 3Dimension stereoscopic display device can improve the safety at the time that the driver looks at the on-screen map.

Further, the 3Dimension stereoscopic display device can be constructed in such a way as to enable the user to set the distance z according to his or her liking. For example, there can be a case in which the driver presets the distance z which satisfies z>Z0 in consideration of the focus position at which the road scene ahead of the vehicle at which the driver is always looking while driving the vehicle is located.

As mentioned above, the 3Dimension stereoscopic display device in accordance with this Embodiment 1 includes the video image playback device 5 for playing back a right-eye image or video image and a left-eye image or video image for three-dimensional stereoscopic display of an inputted image or video image which is a display object, the stereoscopic display monitor 6 for producing a three-dimensional stereoscopic display of the right-eye image or video image and the left-eye image or video image for three-dimensional stereoscopic display of the inputted image or video image which is the display object, which are played back by the video image playback device 5, and the screen composition processing unit 4 for generating the right-eye image or video image and the left-eye image or video image for three-dimensional stereoscopic display in which a virtual display surface for three-dimensional stereoscopic display of the image or video image which is the display object differs from the screen of the stereoscopic display monitor 6, and for outputting the right-eye image or video image and the left-eye image or video image to the video image playback device 5. By doing in this way, the 3Dimension stereoscopic display device can improve the visibility of the 3Dimension stereoscopic image or 3Dimension stereoscopic movie. Particularly in a case in which the 3Dimension stereoscopic display device in accordance with Embodiment 1 is applied to a map display device of an in-vehicle information system, by setting the distance z from the position of the driver's eyes to the virtual map display surface P according to either whether the vehicle is travelling or at rest or the vehicle speed, the 3Dimension stereoscopic display device enables the driver to look at the map displayed in a stereoscopic manner without having a feeling that something is wrong even if the driver turns his or her line of sight toward the map screen. As a result, the 3Dimension stereoscopic display device displays the screen at a position farther away from the driver during travel apparently, thereby reducing the distance travelled by the focus of the driver's eyes between the screen and the road scene ahead of the vehicle, and therefore improving the safety and the visibility of the on-screen map. Further, while the vehicle is at rest, the 3Dimension stereoscopic display device can improve the visibility of the on-screen map by enabling the driver to look at the screen displayed at a position closer to the driver. Therefore, the 3Dimension stereoscopic display device in accordance with the present embodiment can provide an advantage of improving the visibility of the on-screen map both at the time that the vehicle is travelling and at the time that the vehicle is at rest, which cannot be provided by any conventional devices.

Embodiment 2

In above-mentioned Embodiment 1, the case in which software buttons for operational input, such as icons, which are displayed on a planar map are also displayed on a virtual map display surface P is shown. In contrast, in this Embodiment 2, a case in which software buttons for operational input, such as icons, are displayed in a stereoscopic manner on another virtual display surface parallel to a virtual map display surface P will be described.

While a 3Dimension stereoscopic display device in accordance with Embodiment 2 includes a screen composition processing unit for generating a stereoscopic display screen on which software keys for operational input, such as icons, are displayed on another virtual display surface parallel to the virtual map display surface P, the basic structure of the 3Dimension stereoscopic display device is the same as that in accordance with above-mentioned Embodiment 1. Therefore, in the following explanation, the 3Dimension stereoscopic display device in accordance with Embodiment 2 is applied to an in-vehicle information system, and the structure of the 3Dimension stereoscopic display device will be explained with reference to FIG. 3.

Next, the operation of the 3Dimension stereoscopic display device will be explained. When displaying a planar image and also displaying software buttons for operational input on the planar image, the 3Dimension stereoscopic display device in accordance with Embodiment 2 composites images into a 3Dimension stereoscopic image in which the virtual display position of the planar image is placed at a position forward or backward with respect to the screen of a stereoscopic display monitor 6, like in above-mentioned Embodiment 1, and in which the virtual display position of the software buttons for operational input is placed at a position forward or backward with respect to the virtual display surface of the planar image, and displays the 3Dimension stereoscopic image in a stereoscopic manner.

For example, when displaying a planar map and software buttons for operational input in a map display of an in-vehicle navigation device, the 3Dimension stereoscopic display device places the virtual display of the planar map at a position backward with respect to the screen of the stereoscopic display monitor 6 (i.e. at a position farther away from the driver than the screen), while the 3Dimension stereoscopic display device places an icon, such as an "enter button" for performing an operation or a "return button" for cancelling an operation, and an indication of cardinal directions at a position forward with respect to the virtual display surface of the planar map. As a result, the 3Dimension stereoscopic display device makes the icon and the indication of cardinal directions look as if they are floating from the planar map with respect to the driver's position. By doing in this way, the 3Dimension stereoscopic display device make the icon image and the indication of cardinal directions become legible on the map, and can therefore provide an easy-to-use HMI (Human Machine Interface).

Figure 10:
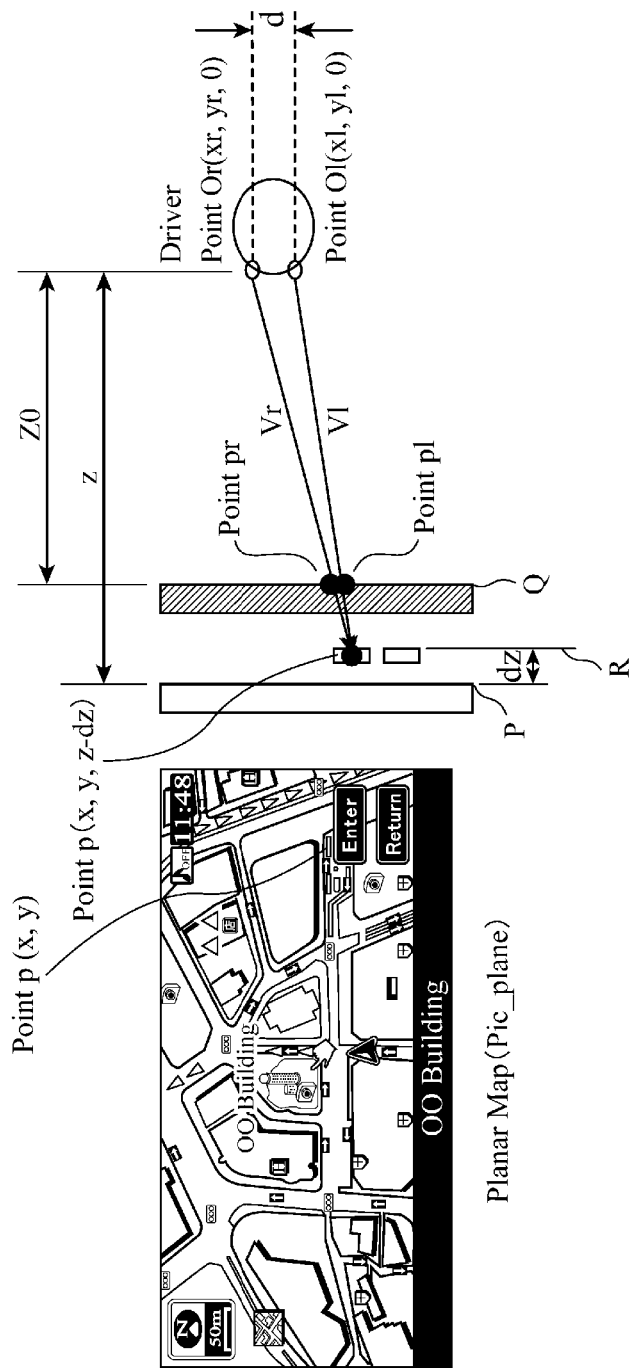
FIG. 10 is a view for explaining a screen compositing process of placing a virtual map display surface of a planar map at a position backward with respect to the screen of a stereoscopic display monitor, and placing a virtual display surface of icons at a position forward with respect to the map display surface in Embodiment 2.
Figure 11:
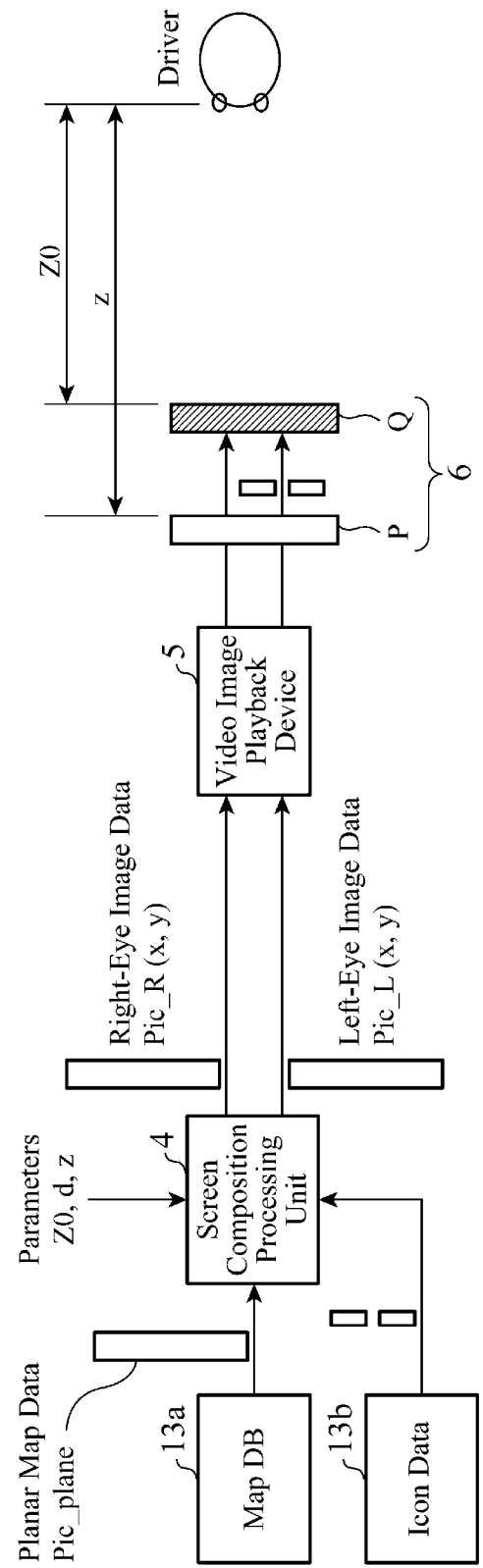
FIG. 11 is a view showing a data flow in the screen compositing process shown in FIG. 10.

FIG. 10 is a view for explaining a screen compositing process of placing the virtual map display surface P of the planar map at a position backward with respect to the screen Q of the stereoscopic display monitor, and placing the virtual display surface R of the icons at a position forward with respect to the virtual map display surface P. FIG. 11 is a view showing a data flow in the screen compositing process shown in FIG. 10.

First, a main CPU 4a reads map data from a map DB 13a stored in an HDD 13, and generates planar map data Pic_plane according to a predetermined map drawing algorithm, as shown in FIG. 11. For example, the planar map data Pic_plane show the planar map which is described in a left part of FIG. 10. The main CPU 4a also reads icon data about icons which are to be superimposed on the planar map shown by the planar map data Pic_plane from icon data 13b stored in the HDD 13.

In the example of FIG. 10, the 3Dimension stereoscopic display device displays the planar map shown by the planar map data Pic_plane on the virtual map display surface P which is placed at a position backward with respect to the screen Q of the stereoscopic display monitor 6. In addition, the 3Dimension stereoscopic display device displays an enter button and a return button which are operation icons on the virtual display surface R which is placed at a position forward with respect to the virtual map display surface P of the planar map. Hereafter, the distance between the map display surface P of the planar map and the display surface R of the icons is expressed as dz. More specifically, the 3Dimension stereoscopic display device makes each of the icons of the enter button and the return button look as if it is floating at the distance dz from the planar map with respect to the driver's position by using stereoscopic vision. In the example shown in FIG. 10, the distance Z0 between the position of the driver's eyes and the screen Q of the stereoscopic display monitor 6 and the distance z between the position of the driver's eyes and the virtual map display surface P have the following relationship: z>Z0.

Right-eye image data Pic_R(x, y) of the planar map are expressed by a set of points pr at each of which a straight line (vector Vr) which connects between a point p(x, y, z) on the virtual map display surface P or a point p(x, y, z−dz) on the display surface R and the point Or(xr, yr, 0) which is the position of the right eye intersects the screen Q of the stereoscopic display monitor 6. In this case, when the angle which the sight line direction of the driver's right eye forms with the normal direction of the screen Q is expressed as θ1, the coordinates of the point pr are shown by (xr−Z0 tan θ1, yr, Z0).

Similarly, left-eye image data Pic_L(x, y) of the planar map are expressed by a set of points pl(xl, yl, Z0) at each of which a straight line (vector Vl) which connects between the point p(x, y, z) on the virtual map display surface P or the point p(x, y, z−dz) on the display surface R and the point Ol(xl, yl, 0) which is the position of the left eye intersects the screen Q of the stereoscopic display monitor 6. In this case, when the angle which the sight line direction of the driver's left eye forms with the normal direction of the screen Q is expressed as θ2, the coordinates of the point pl are shown by (xl−Z0 tan θ2, yl, Z0).

On the other hand, each of the icons of the enter button and the return button in the right-eye image of the planar map is expressed by a set of points pr(xr−(z−dz)tan θ1, yr, z−dz) on the right-eye image, while each the icons of the enter button and the return button in the left-eye image of the planar map is expressed by a set of points pl(xl−(z−dz)tan θ2, yl, z−dz) on the left-eye image.

The screen composition processing unit 4 calculates the points pr and pl in such a way that the distance between the virtual map display surface P and the position of the driver's eyes is equal to z and the distance between the display surface R of the icons and the position of the driver's eyes is equal to (z−dz) by using the planar map data Pic_plane, the parameters Z0, z, and d, and the icon data to generate right-eye image data Pic_R(x, y) and left-eye image data Pic_L(x, y) in the same way that the screen composition processing unit does in accordance with above-mentioned Embodiment 1 does, and outputs the right-eye image data Pic_R(x, y) and the left-eye image data Pic_L(x, y) to a video image playback device 5.

The video image playback device 5 plays back the right-eye image data Pic_R(x, y) and the left-eye image data Pic_L(x, y) which are generated by the screen composition processing unit 4, and outputs them to a stereoscopic display monitor 6. The stereoscopic display monitor 6 displays the planar map and the icons in a stereoscopic manner by using the right-eye image data Pic_R(x, y) and the left-eye image data Pic_L(x, y) which are played back by the video image playback device 5. At this time, the 3Dimension stereoscopic display device makes the icon image look as if it is floating from the planar image when viewed from the position of the driver by using stereoscopic vision.

By further placing the virtual display surface R of the icon image at a position forward with respect to the screen Q of the stereoscopic display monitor 6 (i.e. at a position closer to the driver than the screen) in the above-mentioned screen compositing process, the 3Dimension stereoscopic display device makes the icon image look as if it is floating further closer to the driver from the planar image with respect to the driver's position.

Figure 12:
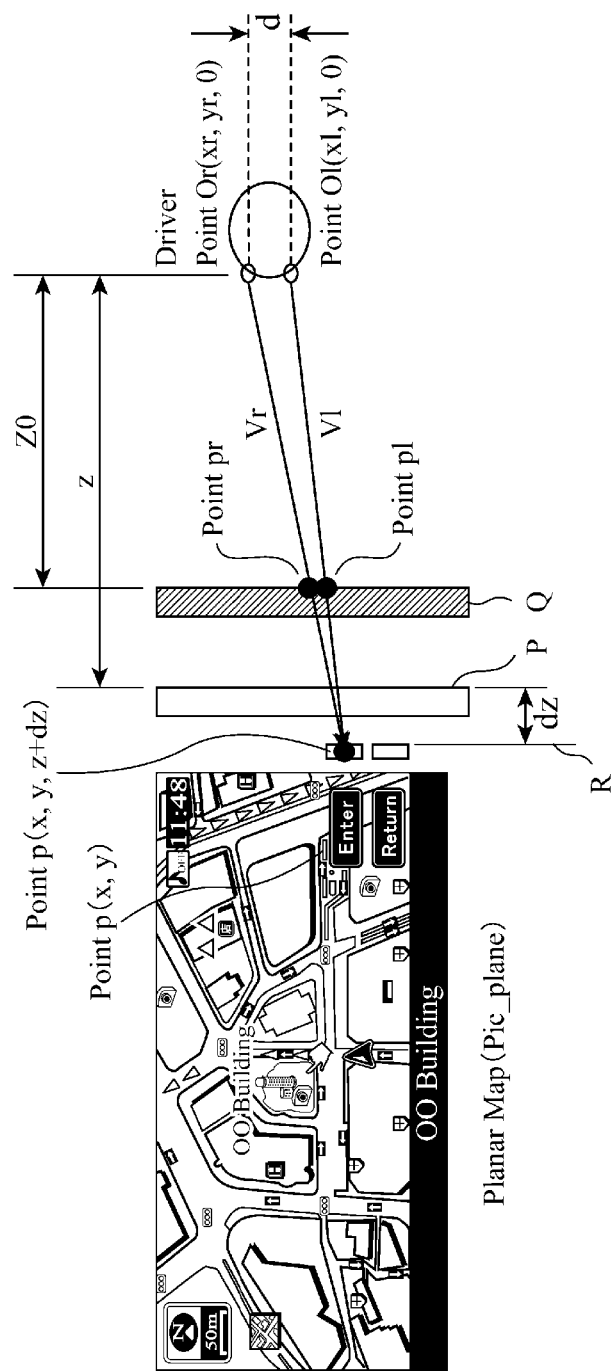
FIG. 12 is a view for explaining a screen compositing process of placing a virtual map display surface of a planar map at a position backward with respect to the screen of a stereoscopic display monitor, and placing a virtual display surface of icons at a position backward with respect to the map display surface.
Figure 13:
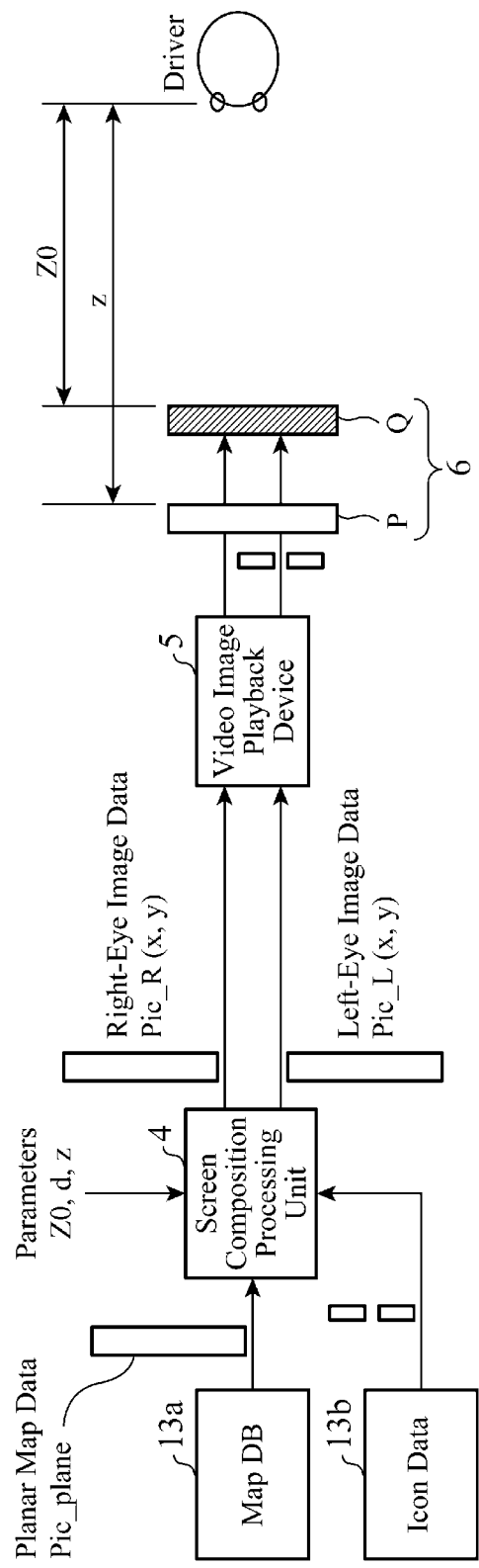
FIG. 13 is a view showing a data flow in the screen compositing process shown in FIG. 12.

FIG. 12 is a view for explaining a screen compositing process of placing the virtual map display surface P of the planar map at a position backward with respect to the screen Q of the stereoscopic display monitor, and placing the virtual display surface of the icons at a position backward with respect to the map display surface P. FIG. 13 is a view showing a data flow in the screen compositing process shown in FIG. 12. In the example shown in FIG. 12, the planar map shown by the planar map data Pic_plane is displayed on the virtual map display surface P which is placed at a position backward with respect to the screen Q of the stereoscopic display monitor 6, like in the example shown in FIG. 10. That is, in this example, the following relationship: z>Z0 is established. On the other hand, each of the icons of the enter button and the return button is displayed on the virtual display surface R which is placed at a position backward with respect to the virtual map display surface P of the planar map, as shown in FIGS. 12 and 13. As a result, each of the icon images of the enter button and the return button is displayed in such a way as to be focused at a position at the distance dz farther away from the planar map with respect to the driver's position.

Figure 14:
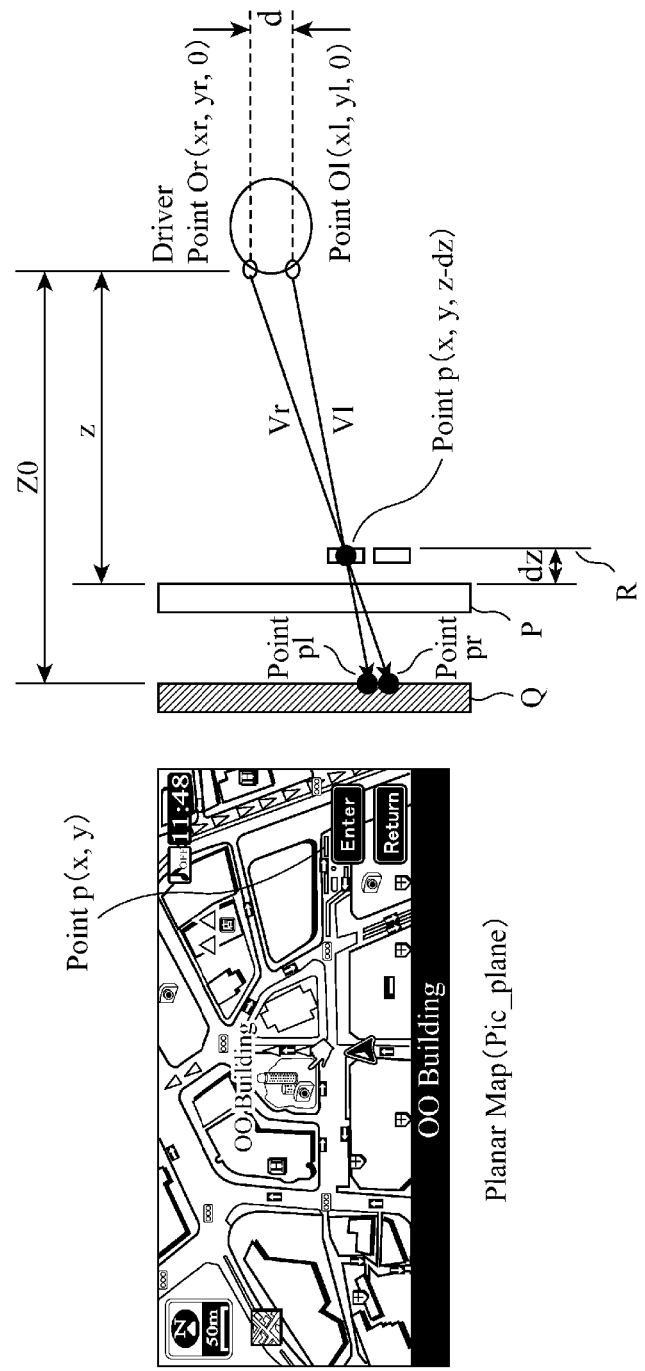
FIG. 14 is a view for explaining a screen compositing process of placing a virtual map display surface of a planar map at a position forward with respect to the screen of a stereoscopic display monitor, and placing a virtual display surface of icons at a position forward with respect to the map display surface.
Figure 15:
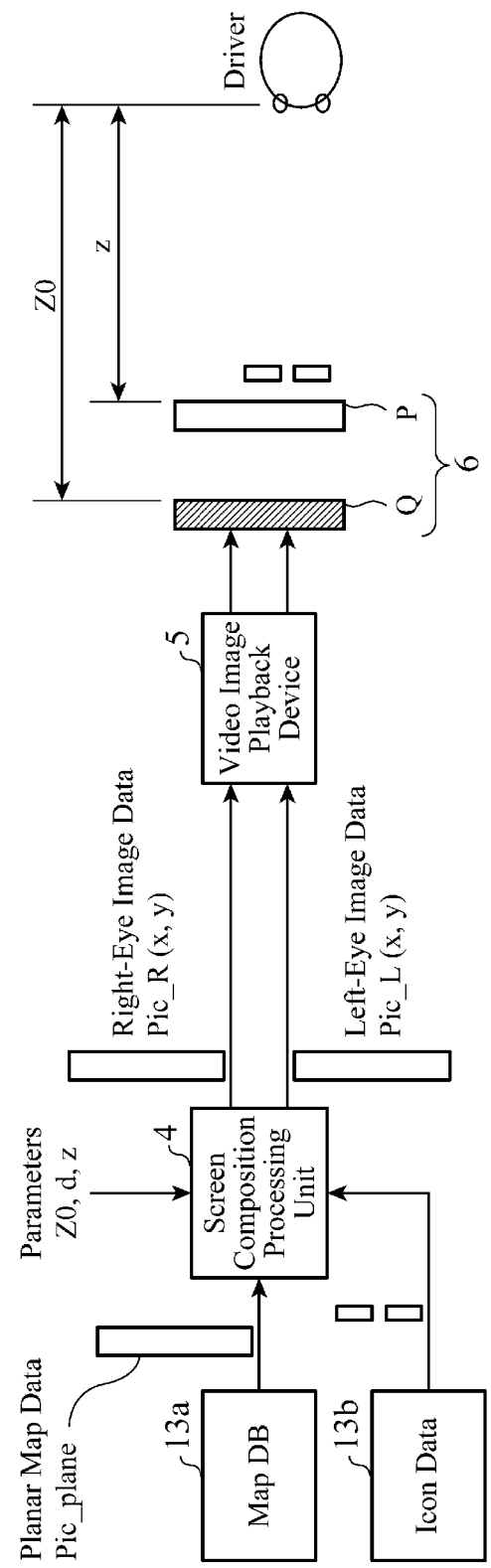
FIG. 15 is a view showing a data flow in the screen compositing process shown in FIG. 14.

FIG. 14 is a view for explaining a screen compositing process of placing the virtual map display surface P of the planar map at a position forward with respect to the screen Q of the stereoscopic display monitor, and placing the virtual display surface R of the icons at a position forward with respect to the map display surface P. FIG. 15 is a view showing a data flow in the screen compositing process shown in FIG. 14. In the example shown in FIG. 14, the planar map shown by the planar map data Pic_plane is displayed on the virtual map display surface P which is placed at a position forward with respect to the screen Q of the stereoscopic display monitor 6. That is, in this example, the following relationship: z<Z0 is established. Further, each of the icons of the enter button and the return button is displayed on the virtual display surface R placed at a position forward with respect to the virtual map display surface P of the planar map, as shown in FIGS. 14 and 15. As a result, the 3Dimension stereoscopic display device makes the planar map look as if it is displayed as a position closer to the driver and also makes each of the icons of the enter button and the return button look as if it is floating closer to the driver than the planar map by using stereoscopic vision.

Figure 16:
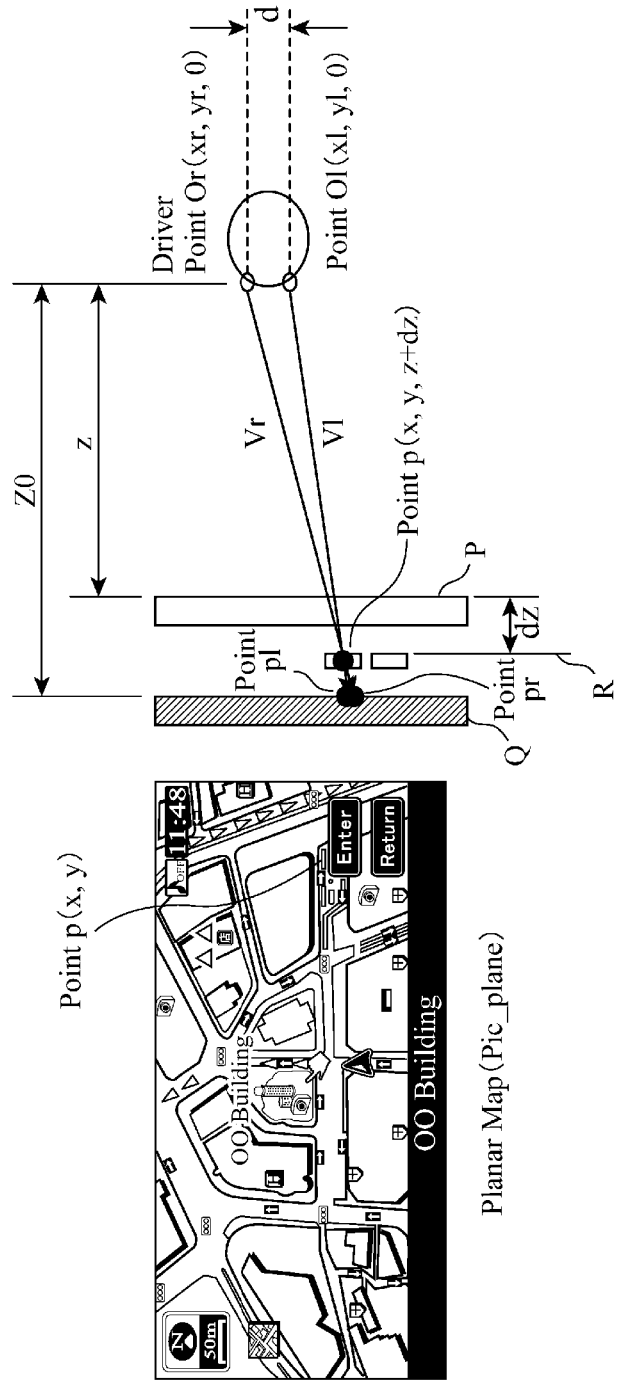
FIG. 16 is a view for explaining a screen compositing process of placing a virtual map display surface of a planar map at a position forward with respect to the screen of a stereoscopic display monitor, and placing a virtual display surface of icons at a position backward with respect to the map display surface.
Figure 17:
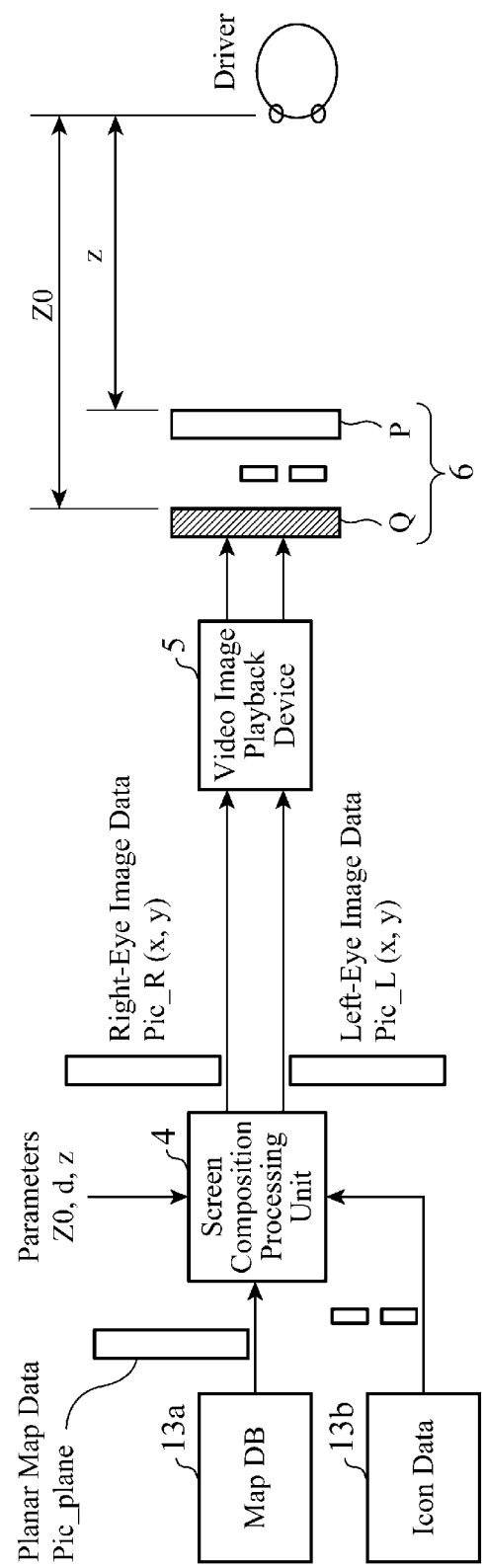
FIG. 17 is a view showing a data flow in the screen compositing process shown in FIG. 16.

FIG. 16 is a view for explaining a screen compositing process of placing the virtual map display surface P of the planar map at a position forward with respect to the screen Q of the stereoscopic display monitor, and placing the virtual display surface R of the icons at a position backward with respect to the map display surface P. FIG. 17 is a view showing a data flow in the screen compositing process shown in FIG. 16. In the example shown in FIG. 16, the planar map shown by the planar map data Pic_plane is displayed on the virtual map display surface P which is placed at a position forward with respect to the screen Q of the stereoscopic display monitor 6, like in the example shown in FIG. 14. That is, in this example, the following relationship: z<Z0 is established. On the other hand, each of the icons of the enter button and the return button is displayed on the virtual display surface R which is placed at a position backward with respect to the virtual map display surface P of the planar map, as shown in FIGS. 16 and 17. As a result, while the 3Dimension stereoscopic display device makes the planar map look as if it is displayed at a position closer to the driver by using stereoscopic vision, the 3Dimension stereoscopic display device makes each of the icon images of the enter button and the return button look as if it is focused at a position farther away from the driver than the planar map by using stereoscopic vision.

By placing the virtual display surface R of the icon image at a position backward with respect to the screen Q of the stereoscopic display monitor 6 (i.e. at a position farther away from the driver than the screen) in the above-mentioned screen compositing process, the 3Dimension stereoscopic display device makes the icon image look as if it is focused at a position still farther away from the driver.

Figure 18:
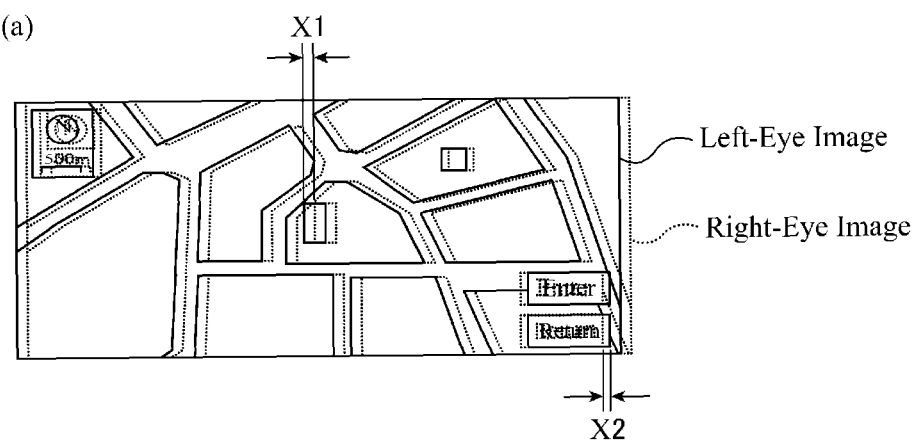
FIG. 18 is a view showing an example of a stereoscopic display produced by a 3Dimension stereoscopic display device in accordance with Embodiment 2.
Figure 18:
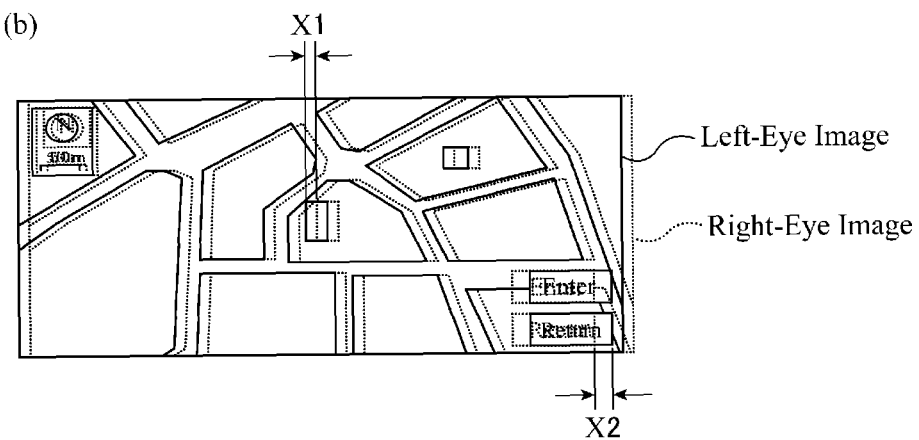

FIG. 18 is a view showing an example of the stereoscopic display produced by the 3Dimension stereoscopic display device in accordance with Embodiment 2. FIG. 18(a) shows a case in which z>Z0, and the display surface R of the icons is placed at a position backward with respect to the map display surface P, and FIG. 18(b) shows a case in which z>Z0 and the display surface R of the icons is placed at a position forward with respect to the map display surface P. The gap X1 between the left-eye image and the right-eye image in the case shown in FIG. 18(a) is equal to that in the case shown in FIG. 18(b). Further, the gap X2 between the left-eye image and the right-eye image of each of the icon images of the enter button and the return button in the case shown in FIG. 18(a) is smaller than that in the case shown in FIG. 18(b). More specifically, in the case shown in FIG. 18(b), the 3Dimension stereoscopic display device makes the icon image look as if it is floating closer to the driver than in the case shown in FIG. 18(a) by using stereoscopic vision.

Figure 19:
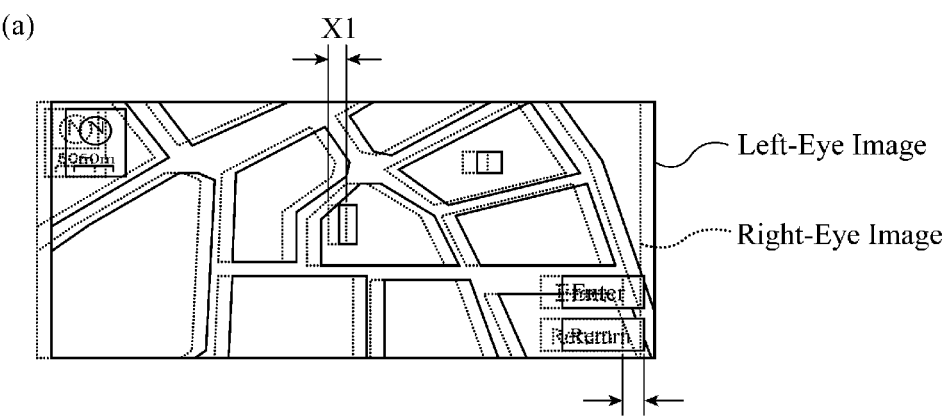
FIG. 19 is a view showing an example of a stereoscopic display produced by a 3Dimension stereoscopic display device in accordance with Embodiment 2.
Figure 19:
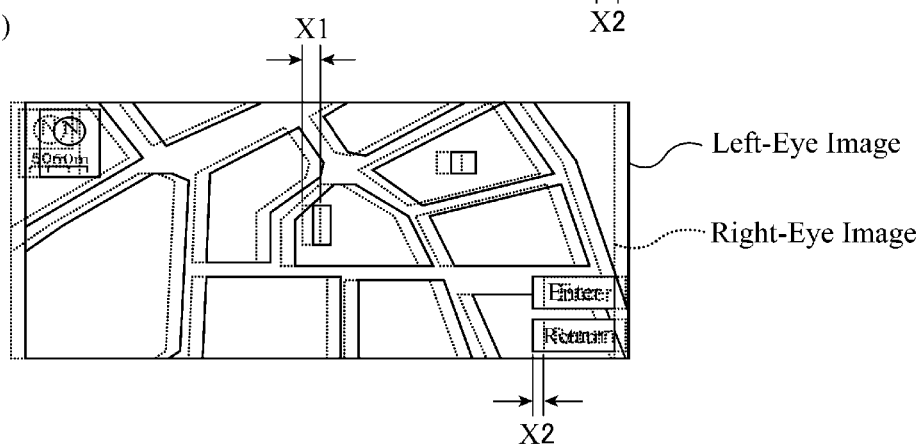

FIG. 19 is a view showing another example of the stereoscopic display produced by the 3Dimension stereoscopic display device in accordance with Embodiment 2. FIG. 19(a) shows a case in which z<Z0, and the display surface R of the icons is placed at a position forward with respect to the map display surface P, and FIG. 19(b) shows a case in which z<Z0 and the display surface R of the icons is placed at a position backward with respect to the map display surface P. The gap X1 between the left-eye image and the right-eye image in the case shown in FIG. 19(a) is equal to that in the case shown in FIG. 19(b), and this gap X1 is larger than that shown in FIGS. 18(a) and 19(b). More specifically, the 3Dimension stereoscopic display device makes the planar map look as if it is displayed closer to the driver than in the case of FIG. 18 by using stereoscopic vision. Further, the gap X2 between the left-eye image and the right-eye image of each of the icon images of the enter button and the return button in the case shown in FIG. 19(a) is larger than that in the case shown in FIG. 19(b). More specifically, in the case shown in FIG. 19(a), the 3Dimension stereoscopic display device makes the icon image look as if it is floating closer to the driver than in the case shown in FIG. 19(b) by using stereoscopic vision.

As mentioned above, when the image which is the display object is a planar image and an icon image to be displayed on the planar image, the screen composition processing unit 4 in accordance with this Embodiment 2 generates a right-eye image and a left-eye image for three-dimensional stereoscopic display in which a virtual display surface on which the planar image is displayed in a three-dimensional stereoscopic manner, a virtual display surface on which the icon image is displayed in a three-dimensional stereoscopic manner, and the screen of the stereoscopic display monitor unit differ from one another. In this structure, the 3Dimension stereoscopic display device places the virtual display surface R on which the icon image including a software button for operational input having a special meaning, such as an icon, and an indication of cardinal directions is displayed at a position forward or backward with respect to the virtual map display surface P of the planar map (i.e. at a position closer to the driver than the virtual map display surface or at a position farther away from the driver than the virtual map display surface). As a result, the 3Dimension stereoscopic display device makes icons and the indication of cardinal directions look as if they are floating closer to the driver than the planar map, or, on the contrary, look as if they are focused at a position farther away from the driver than the planar map. By doing in this way, the 3Dimension stereoscopic display device makes the icon image and the indication of cardinal directions become legible on the map, and can therefore provide an easy-to-use HMI.

Further, although a stereoscopic display of icons is explained in above-mentioned Embodiment 2, a three-dimensional building image, a solid topographical model image, or a stereoscopic display image with contour lines can be displayed to look as if the image is floating from the virtual map display surface P of the planar map when viewed from the driver's position, or can be displayed in a stereoscopic manner in such a way as to be placed at a position backward with respect to the virtual map display surface P of the planar map.

Further, in above-mentioned Embodiment 2, an event, such as a vehicle position, a route, a guidance point, a cursor, a three-dimensional agent display, or other traffic information, can be displayed to look as if the event is floating forward from the virtual map display surface of the planar map. In addition, significant characters, such as characters showing a destination, can be displayed in a stereoscopic manner. A highway schematic illustration or POIs can be taken as examples. Further, when the driver performs an operation of specifying a POI displayed on the planar map, the 3Dimension stereoscopic display device can display a balloon in which information about this specified POI is described by using stereoscopic vision in such a way that the balloon looks as if it is floating forward from the virtual map display surface of the planar map when viewed from the driver's position.

Embodiment 3

In Embodiment 3, an example in which a 3Dimension stereoscopic display device in accordance with this embodiment displays a display image according to an event occurring in an in-vehicle information system to which the 3Dimension stereoscopic display device is applied on another virtual display surface parallel to a virtual map display surface P of a planar map in a stereoscopic manner will be described. Hereafter, a case in which the 3Dimension stereoscopic display device displays a route guidance screen acquired through navigation processing in a stereoscopic manner as a display image according to an event will be described.

While the 3Dimension stereoscopic display device in accordance with Embodiment 3 includes a screen composition processing unit for producing a stereoscopic display screen on which a display image according to an event is displayed in a stereoscopic manner on another virtual display surface parallel to a virtual map display surface P, the basic structure of the 3Dimension stereoscopic display device is the same as that in accordance with above-mentioned Embodiment 1. Therefore, in the following explanation, the 3Dimension stereoscopic display device in accordance with Embodiment 3 is applied to an in-vehicle information system, and the structure of the 3Dimension stereoscopic display device will be explained with reference to FIG. 3.

Next, the operation of the 3Dimension stereoscopic display device will be explained. When displaying a planar image and a display image according to an event side by side, the 3Dimension stereoscopic display device in accordance with Embodiment 3 composites images into a 3Dimension stereoscopic image in which a virtual display of the planar image is placed at a position forward or backward with respect to the screen of a stereoscopic display monitor 6, like in above-mentioned Embodiment 1, and in which a virtual display of the display image according to an event is placed at a position forward or backward with respect to the virtual display surface of the planar image, and displays the 3Dimension stereoscopic image in a stereoscopic manner.

For example, when displaying a planar map and a route guidance screen in a map display of the in-vehicle navigation device, the 3Dimension stereoscopic display device places a virtual display of the planar map at a position backward with respect to the screen of the stereoscopic display monitor 6 (i.e. at a position farther away from the driver than the screen), while the 3Dimension stereoscopic display device places the route guidance screen at a position forward with respect to the virtual display surface of the planar map. As a result, the 3Dimension stereoscopic display device makes the route guidance screen look as if it is floating from the planar map with respect to the driver's position. By doing in this way, the 3Dimension stereoscopic display device makes the route guidance screen become legible on the screen of the stereoscopic display monitor 6 and can therefore provide an easy-to-use HMI.

Figure 20:
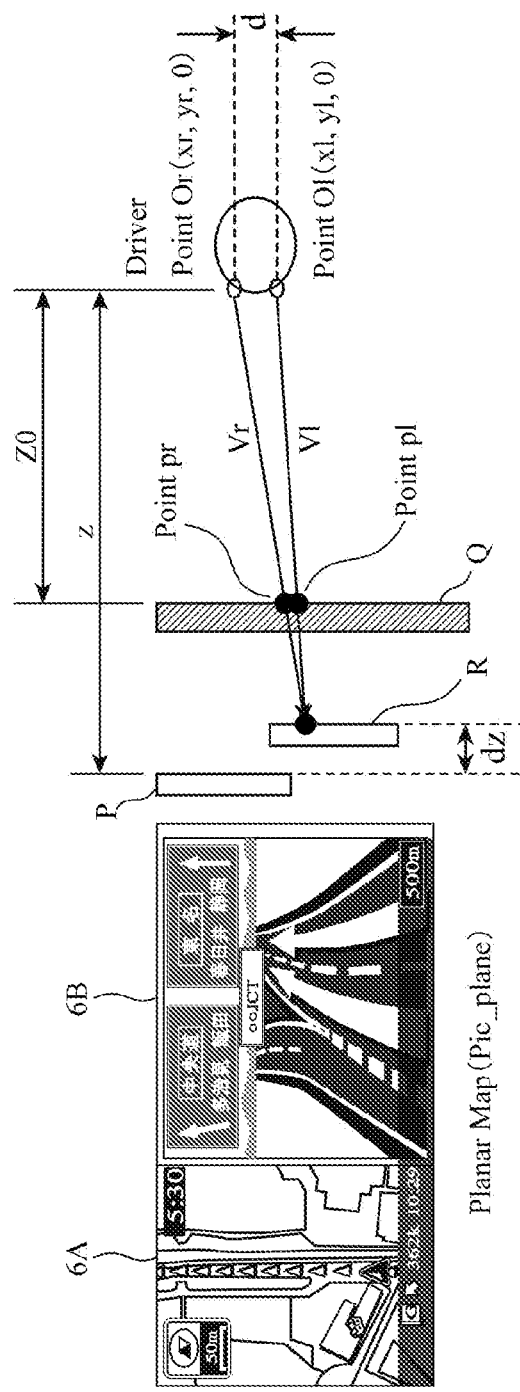
FIG. 20 is a view for explaining a screen compositing process of placing a virtual map display surface of a planar map at a position backward with respect to the screen of a stereoscopic display monitor, and placing a virtual display surface of a route guidance screen at a position forward with respect to the map display surface in Embodiment 3.
Figure 21:
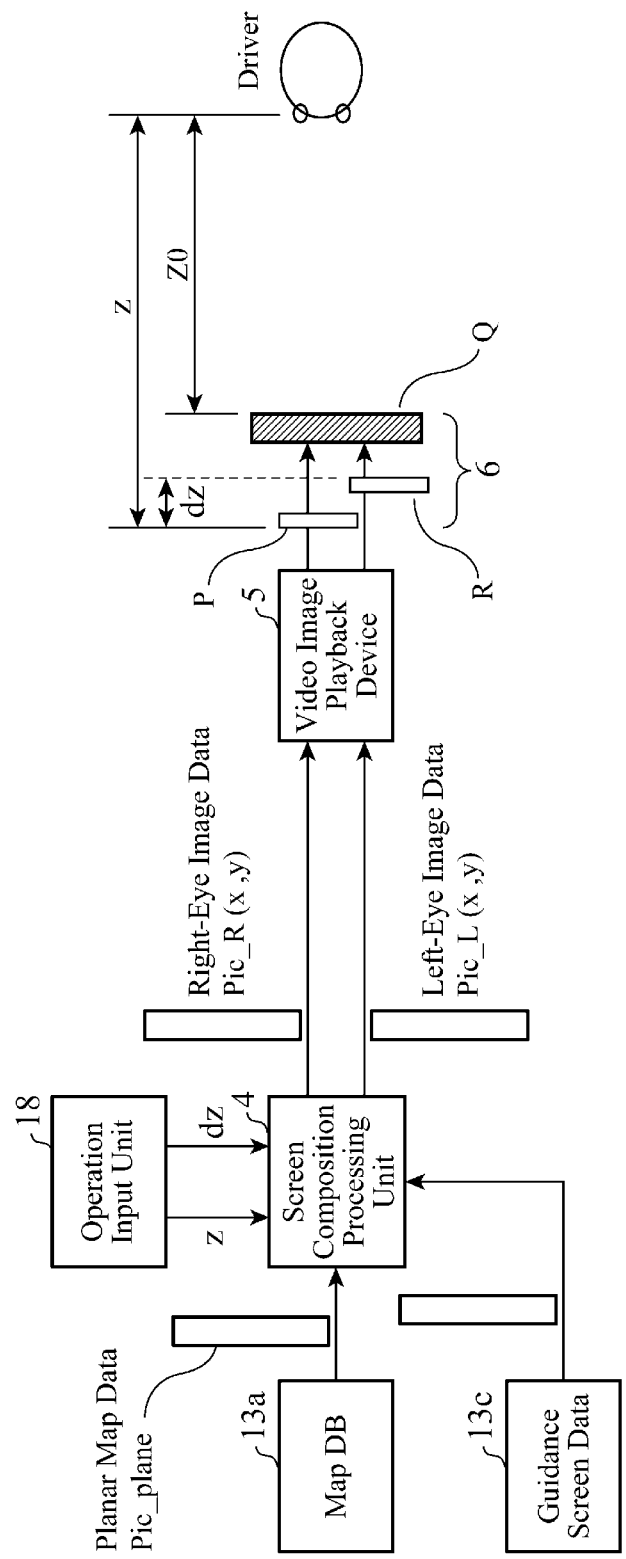
FIG. 21 is a view showing a data flow in the screen compositing process shown in FIG. 20.

FIG. 20 is a view for explaining a screen compositing process of placing the virtual map display surface P of the planar map 6A at a position backward with respect to the screen Q of the stereoscopic display monitor, and placing the virtual display surface R of the route guidance screen 6B at a position forward with respect to the virtual map display surface P. FIG. 21 is a view showing a data flow in the screen compositing process shown in FIG. 20. In FIG. 20, an example in which two screens including the planar map 6A and the route guidance screen 6B which is a screen for providing guidance on a branch on the route are displayed, and the route guidance screen 6B is displayed in a stereoscopic manner to look as if it is floating toward the driver by using stereoscopic vision.

First, a main CPU 4a reads map data from a map DB 13a stored in an HDD 13, and generates planar map data Pic_plane according to a predetermined map drawing algorithm, as shown in FIG. 21. For example, the planar map data Pic_plane show the planar map 6A which is described in a left part of FIG. 20. The main CPU 4a also reads guidance screen data showing the route guidance screen 6B which is to be displayed together with the planar map 6A shown by the planar map data Pic_plane from guidance screen data 13c stored in the HDD 13.

In the example shown in FIG. 20, the 3Dimension stereoscopic display device displays the planar map 6A shown by the planar map data Pic_plane on the virtual map display surface P which is placed at a position backward with respect to the screen Q of the stereoscopic display monitor 6. The 3Dimension stereoscopic display device further displays the route guidance screen 6B on the virtual display surface R which is placed at a position forward with respect to the virtual map display surface P of the planar map 6A. Hereafter, the distance between the map display surface P of the planar map and the display surface R of the route guidance screen 6B is expressed as dz. More specifically, the 3Dimension stereoscopic display device makes the route guidance screen 6B look as if it is floating at the distance dz from the planar map 6A with respect to the driver's position by using stereoscopic vision. In the example shown in FIG. 20, the distance Z0 between the position of the driver's eyes and the screen Q of the stereoscopic display monitor 6 and the distance z between the position of the driver's eyes and the virtual map display surface P have the following relationship: $z > Z0$.

Right-eye image data Pic_R(x, y) of the planar map 6A are expressed by a set of points pr at each of which a straight line (vector Vr) which connects between a point p(x, y, z) on the virtual map display surface P or a point p(x, y, z−dz) on the display surface R and the point Or(xr, yr, 0) which is the position of the right eye intersects the screen Q of the stereoscopic display monitor 6. In this case, when the angle which the sight line direction of the driver's right eye forms with the normal direction of the screen Q is expressed as θ1, the coordinates of the point pr are shown by (xr−Z0 tan θ1, yr, Z0).

Similarly, left-eye image data Pic_L(x, y) of the planar map are expressed by a set of points pl(xl, yl, Z0) at each of which a straight line (vector Vl) which connects between the point p(x, y, z) on the virtual map display surface P or the point p(x, y, z−dz) on the display surface R and the point Ol(xl, yl, 0) which is the position of the left eye intersects the screen Q of the stereoscopic display monitor 6. In this case, when the angle which the sight line direction of the driver's left eye forms with the normal direction of the screen Q is expressed as θ2, the coordinates of the point pl are shown by (xl−Z0 tan θ2, yl, Z0).

On the other hand, the image of the route guidance screen 6B in the right-eye image of the planar map 6A is expressed by a set of points pr(xr−(z−dz)tan θ1, yr, z−dz) on the right-eye image, while the image of the route guidance screen 6B in the left-eye image of the planar map 6A is expressed by a set of points pl(xl−(z−dz)tan θ2, yl, z−dz) on the left-eye image.

A screen composition processing unit 4 calculates the points pr and pl in such a way that the distance between the virtual map display surface P and the position of the driver's eyes is equal to z and the distance between the display surface R of the route guidance screen 6B and the position of the driver's eyes is equal to (z−dz) by using the planar map data Pic_plane, the parameters z and dz, and the route guidance data to generate right-eye image data Pic_R(x, y) and left-eye image data Pic_L(x, y) in the same way that the screen composition processing unit in accordance with above-mentioned Embodiment 1 does, and outputs the right-eye image data Pic_R(x, y) and the left-eye image data Pic_L(x, y) to a video image playback device 5.

The video image playback device 5 plays back the right-eye image data Pic_R(x, y) and the left-eye image data Pic_L (x, y) which are generated by the screen composition processing unit 4, and outputs them to a stereoscopic display monitor 6. The stereoscopic display monitor 6 displays the planar map and the icons in a stereoscopic manner by using the right-eye image data Pic_R(x, y) and the left-eye image data Pic_L(x, y) which are played back by the video image playback device 5. At this time, the 3Dimension stereoscopic display device makes the image of the route guidance screen 6B look as if it is floating next to the planar map 6A with respect to the driver's position by using stereoscopic vision.

By doing in the same way that the 3Dimension stereoscopic display device in accordance with above-mentioned Embodiment 2 does, the 3Dimension stereoscopic display device can place a virtual display surface R of either an arrow indicating the direction in which the vehicle should travel or a display of the destination on the route guidance screen 6B at a position forward with respect to the screen Q of the stereoscopic display monitor 6. As a result, the 3Dimension stereoscopic display device makes the arrow indicating the direction in which the vehicle should travel or the display of the destination look as if it is floating from the planar map 6A.

As mentioned above, when the image which is the display object is a planar map 6A and a route guidance screen 6B which is to be displayed together with the planar map, the screen composition processing unit 4 in accordance with this Embodiment 3 generates a right-eye image and a left-eye image for three-dimensional stereoscopic display in which a virtual display surface P on which the planar map 6A is displayed in a three-dimensional stereoscopic manner, a virtual display surface R on which the route guidance screen 6B is displayed in a three-dimensional stereoscopic manner, and the screen Q of the stereoscopic display monitor unit 6 differ from one another. In this structure, the 3Dimension stereoscopic display device places the virtual display surface R of the route guidance screen 6B at a position forward with respect to the virtual map display surface P of the planar map 6A (i.e. at a position closer to the driver than the virtual map display surface). As a result, the route guidance screen 6B looks as if it is floating closer to the driver than the planar map. As a result, the 3Dimension stereoscopic display device can make the route guidance screen 6B become legible, and can therefore provide an easy-to-use HMI.

Further, in above-mentioned Embodiment 3, the 3Dimension stereoscopic display device can display one of two screen displays in a stereoscopic manner in such a way that the screen display looks as if it is floating, instead of displaying the route guidance screen 6B acquired through the navigation processing in a floating manner. In addition, when displaying icons on the two screen displays which consist of the planar map 6A and the route guidance screen 6B, the 3Dimension stereoscopic display device can display the planar map 6A, the route guidance screen 6B, and the icons in a stereoscopic manner in such a way that the planar map 6A, the route guidance screen 6B, and the icons look as if they are floating at different levels. For example, icons each used for receiving an operational input are displayed in a stereoscopic manner in such a way as to be placed closest to the driver, the route guidance screen 6B is displayed in a stereoscopic manner in such a way as to be placed second closest to the driver, and the planar map 6A is displayed in a stereoscopic manner in such a way as to be placed farthest from the driver.

In addition, when an event showing an emergency occurs, the 3Dimension stereoscopic display device in accordance with above-mentioned Embodiment 3 displays an image corresponding to the event in a stereoscopic manner according to this event in such a way that the image is floating toward the driver. For example, when the occurrence of a traffic jam on a route for which the navigation device provides route guidance is notified, the screen composition processing unit 4 displays a screen for inquiring of the driver whether or not to make a search for another route in a stereoscopic manner in such a way that the screen is floating toward the driver from the planar map.

Embodiment 4

In above-mentioned Embodiments 1 to 3, the virtual map display surface P of the planar map is parallel to the screen P of the stereoscopic display monitor 6. In this Embodiment 4, an embodiment in which a virtual map display surface P is turned by a predetermined angle in a rightward or leftward direction will be described. By doing in this way, a 3Dimension stereoscopic display device can produce a stereoscopic display according to the direction of a viewer. Typically, a display monitor of a navigation device is disposed in a central portion of the dashboard of a vehicle, and the driver looks at the display monitor's screen in a slanting direction. Therefore, the 3Dimension stereoscopic display device in accordance with Embodiment 4 enables the driver to look at the screen head on or at a better angle by turning a virtual map display surface P by a predetermined angle in a rightward or leftward direction.

While the 3Dimension stereoscopic display device in accordance with Embodiment 4 includes a screen composition processing unit for generating a stereoscopic display screen on which the virtual map display surface P of a planar map is turned by a predetermined angle in a rightward or leftward direction, the basic structure of the 3Dimension stereoscopic display device is the same as that in accordance with above-mentioned Embodiment 1. Therefore, in the following explanation, the 3Dimension stereoscopic display device in accordance with Embodiment 4 is applied to an in-vehicle information system, and the structure of the 3Dimension stereoscopic display device will be explained with reference to FIG. 3.

Figure 22:
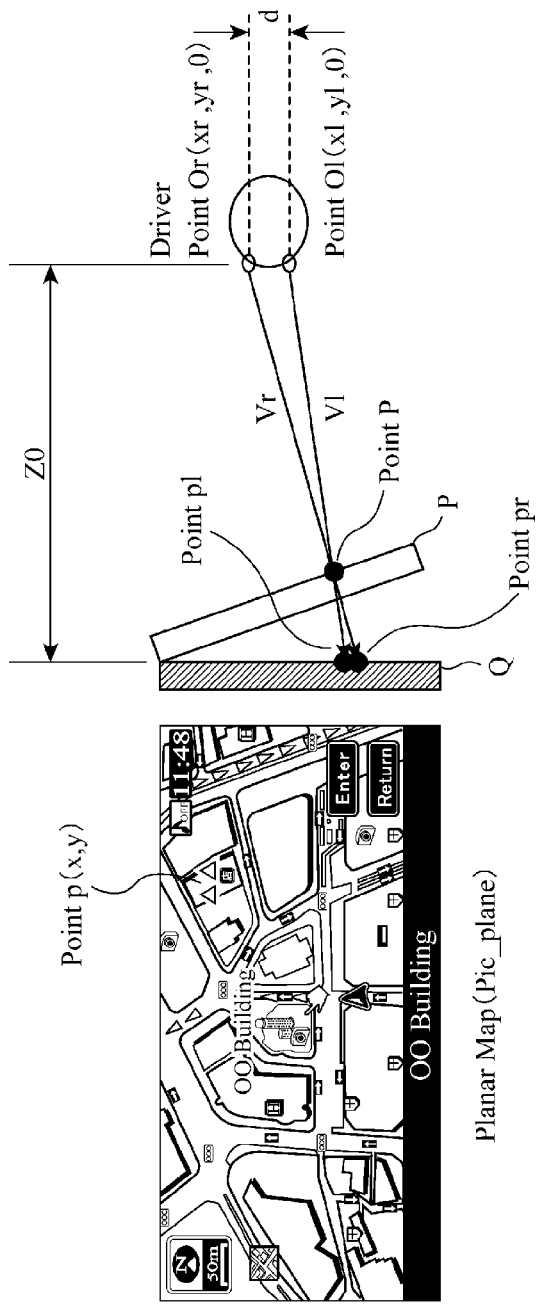
FIG. 22 is a view for explaining a screen compositing process of turning a virtual map display surface of a planar map in a horizontal direction in Embodiment 4.
Figure 23:
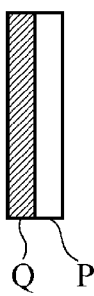
FIG. 23 is a view schematically showing the details of the screen compositing process shown in FIG. 22.
Figure 23:
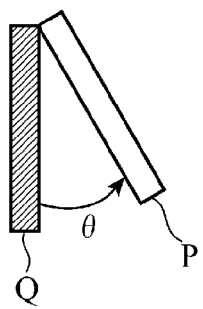

Next, the operation of the 3Dimension stereoscopic display device will be explained. FIG. 22 is a view for explaining a screen compositing process of turning the virtual map display surface P of a planar map in a horizontal direction. FIG. 23 is a view schematically showing the details of the screen compositing process shown in FIG. 22. In the example shown in FIG. 22, by turning the virtual map display surface P of the planar map by an angle θ around the right side of the screen Q of the stereoscopic display monitor 6 in a rightward direction in a state (z=Z0) in which the distance Z0 from the position of the driver's eyes to the virtual map display surface P of the planar map is the same as that from the position of the driver's eyes to the screen Q of the stereoscopic display monitor 6, as shown in FIG. 23(*a*), the 3Dimension stereoscopic display device enters a state as shown in FIG. 23(*b*).

First, a main CPU 4*a* reads map data from a map DB 13*a* stored in an HDD 13, and generates planar map data Pic_ plane according to a predetermined map drawing algorithm. For example, the planar map data Pic_plane show the planar map which is described in a left part of FIG. 22.

Right-eye image data Pic_R(x, y) of the planar map are expressed by a set of points pr at each of which an extension (vector Vr) of a straight line which connects between a point p(x, y, Z0−y sin θ) on the virtual map display surface P and the point Or(xr, yr, 0) which is the position of the right eye intersects the screen Q of the stereoscopic display monitor 6. In this case, when the angle which the sight line direction of the driver's right eye forms with the normal direction of the screen Q is expressed as θ1, the coordinates of the point pr are shown by (xr−Z0 tan θ1, yr, Z0).

Similarly, left-eye image data Pic_L(x, y) of the planar map are expressed by a set of points pl at each of which an extension (vector Vl) of a straight line which connects between the point p(x, y, Z0−y sin θ) on the virtual map display surface P and the point Ol(xl, yl, 0) which is the position of the left eye intersects the screen Q of the stereoscopic display monitor 6. In this case, when the angle which the sight line direction of the driver's left eye forms with the normal direction of the screen Q is expressed as θ2, the coordinates of the point pl are shown by (xl−Z0 tan θ2, yl, Z0).

A screen composition processing unit 4 calculates the points pr and pl in such a way that the distance between the virtual map display surface P and the position of the driver's right and left eyes is equal to (Z0−y sin θ) by using the planar map data Pic_plane and the parameters Z0 and d to generate right-eye image data Pic_R(x, y) and left-eye image data Pic_L (x, y), and outputs the right-eye image data Pic_R(x, y) and the left-eye image data Pic_L(x, y) to a video image playback device 5.

The video image playback device 5 plays back the right-eye image data Pic_R(x, y) and the left-eye image data Pic_L (x, y) which are generated by the screen composition processing unit 4, and outputs them to a stereoscopic display monitor 6. The stereoscopic display monitor 6 displays the planar map in a stereoscopic manner by using the right-eye image data Pic_R(x, y) and the left-eye image data Pic_L(x, y) which are played back by the video image playback device 5.

Figure 24:
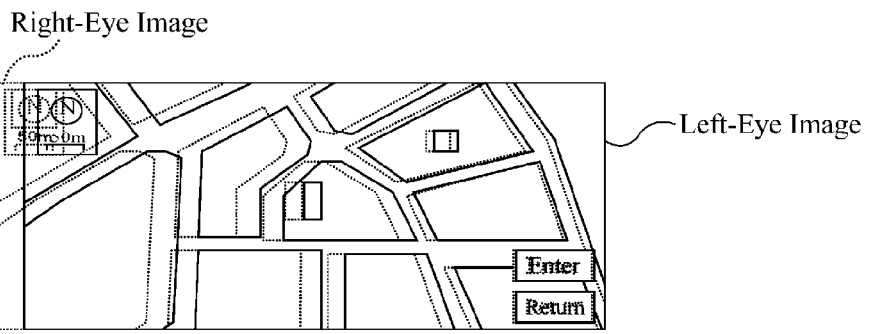
FIG. 24 is a view showing an example of a stereoscopic display produced by a 3Dimension stereoscopic display device in accordance with Embodiment 4.

FIG. 24 is a view showing an example of a stereoscopic display produced by the 3Dimension stereoscopic display device in accordance with Embodiment 4. Because the 3Dimension stereoscopic display device makes the virtual map display surface P of the planar map be closer to the driver with increasing distance from the right side to the left side of the virtual map display surface by performing the above-mentioned screen compositing process, the gap between the left-eye image and the right-eye image becomes large with increasing distance from the right side to the left side of the virtual map display surface, as shown in FIG. 24. At this time, the 3Dimension stereoscopic display device displays the planar map on the screen of the stereoscopic display monitor 6 by using stereoscopic vision in such a way that the planar map looks as if it is floating closer to the driver with increasing distance from the right side to the left side of the planar map and the entire planar map is turned in a rightward direction.

In the above-mentioned screen compositing process, the example in which the virtual map display surface P of the planar map is turned around the right side of the screen Q of the stereoscopic display monitor 6 in a rightward direction in the state (z=Z0) in which the virtual map display surface P of the planar map is parallel to the screen Q of the stereoscopic display monitor 6 is shown. As an alternative, like in above-mentioned Embodiment 1, the virtual map display surface P can be turned in either of rightward and leftward directions in a state in which the virtual map display surface is placed at a position backward or forward with respect to the screen Q.

Further, the 3Dimension stereoscopic display device can set the angle θ by which the virtual map display surface P of the planar map is turned to the screen composition processing unit 4 through a user operation, and can change the already-set angle value through a user operation.

The 3Dimension stereoscopic display device can determine the direction in which the virtual map display surface P of the planar map is turned according to the result of the detection of whether either the driver or a passenger in the front seat next to the driver has been operating the device in such a way that the virtual map display surface is facing the driver or the passenger in the front seat. For example, a detection unit for detecting whether either the driver or a passenger in the front seat next to the driver has been operating the device is disposed, and the screen composition processing unit 4 determines in which one of rightward and leftward directions the virtual map display surface P of the planar map should be turned according to a detection signal from this detection unit.

As mentioned above, because the screen composition processing unit 4 in accordance with this Embodiment 4 generates a right-eye image or video image and a left-eye image or video image for three-dimensional stereoscopic display in which a virtual map display surface P on which a planar map which is a display object is displayed in a three-dimensional stereoscopic manner is turned in a horizontal direction, the 3Dimension stereoscopic display device can produce a stereoscopic display according to the direction of the viewer's line of sight. For example, by turning the map display surface P toward the driver in a horizontal direction, the 3Dimension stereoscopic display device enables the driver to view the planar map head on, thereby being able to improve the visibility of the planar map.

Embodiment 5

In above-mentioned Embodiment 4, the embodiment in which the 3Dimension stereoscopic display device turns the virtual map display surface P of a planar map by a predetermined angle in a rightward or leftward direction is shown. In contrast, in this Embodiment 5, an embodiment in which a map display surface P is tilted by a predetermined angle (angle of elevation) in a vertical direction will be mentioned. By doing in this way, the device can produce a stereoscopic display according to the direction of a viewer's line of sight, like that in accordance with above-mentioned Embodiment 4. Typically, a display monitor of a navigation device is disposed in the dashboard of a vehicle which is located under the driver's face, and therefore the driver needs to move his or her line of sight downward to look at the display monitor's screen. Therefore, a 3Dimension stereoscopic display device in accordance with Embodiment 5 produces a stereoscopic display according to the direction of the driver's line of sight by tilting the virtual map display surface P by a predetermined angle of elevation.

While the 3Dimension stereoscopic display device in accordance with Embodiment 5 includes a screen composition processing unit for generating a stereoscopic display screen on which the virtual map display surface P of a planar map is tilted by a predetermined angle of elevation, the basic structure of the 3Dimension stereoscopic display device is the same as that in accordance with above-mentioned Embodiment 1. Therefore, in the following explanation, the 3Dimension stereoscopic display device in accordance with Embodiment 4 is applied to an in-vehicle information system, and the structure of the 3Dimension stereoscopic display device will be explained with reference to FIG. 3.

Figure 25:
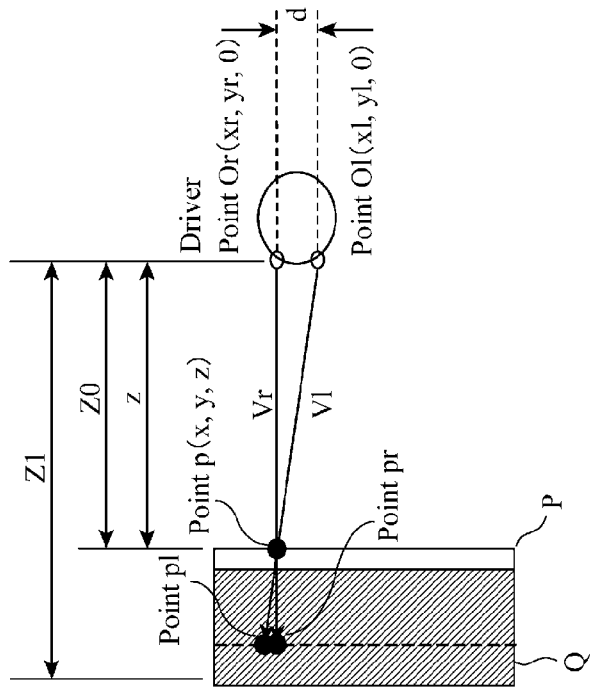
FIG. 25 is a view for explaining a screen compositing process of tilting a virtual map display surface of a planar map in a vertical direction in Embodiment 5.
Figure 25:
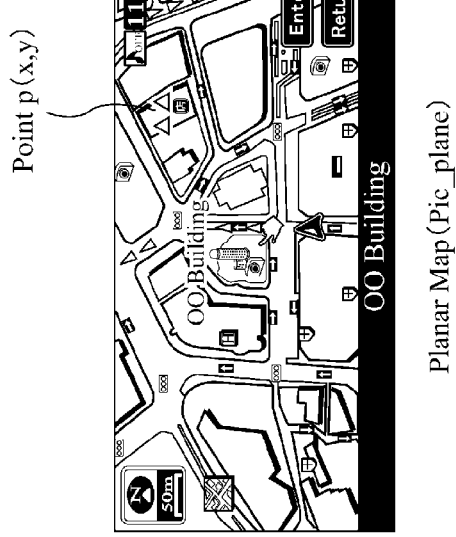
Figure 26:
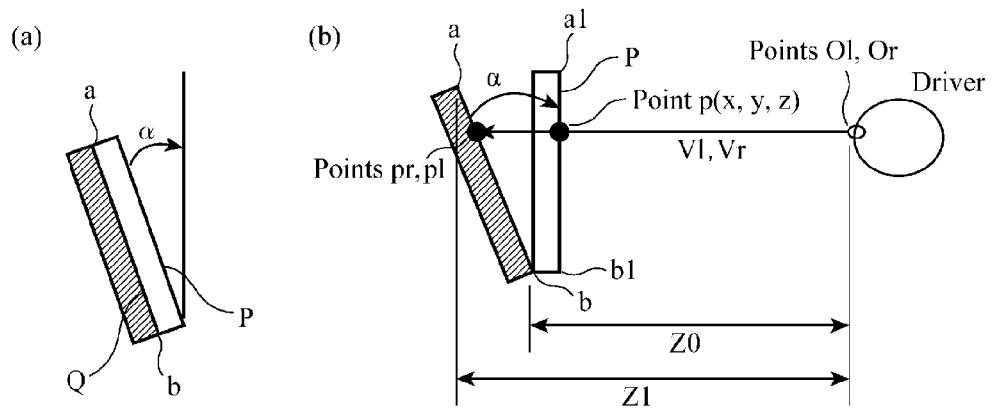
FIG. 26 is a view schematically showing the details of the screen compositing process shown in FIG. 25.

Next, the operation of the 3Dimension stereoscopic display device will be explained. FIG. 25 is a view for explaining a screen compositing process of tilting the virtual map display surface of a planar map in a vertical direction in Embodiment 5. FIG. 26 is a view schematically showing the details of the screen compositing process shown in FIG. 25. In the example shown in FIG. 25, by tilting the virtual map display surface P of the planar map by an angle of elevation α from the screen Q of the stereoscopic display monitor 6 around the lower side of this screen Q in a state (z=Z0) in which the distance Z0 from the position of the driver's eyes to the virtual map display surface P of the planar map is the same as that from the position of the driver's eyes to the screen Q of the stereoscopic display monitor 6 and the screen Q is tilted at the angle of elevation α from the vertical, as shown in FIG. 26(a), the 3Dimension stereoscopic display device enters a state as shown in FIG. 26(b).

First, a main CPU 4a reads map data from a map DB 13a stored in an HDD 13, and generates planar map data Pic_plane according to a predetermined map drawing algorithm. For example, the planar map data Pic_plane show the planar map which is described in a left part of FIG. 25.

Right-eye image data Pic_R(x, y) of the planar map are expressed by a set of points pr at each of which an extension (vector Vr) of a straight line which connects between a point p(x, y, z) on the virtual map display surface P and the point Or(xr, yr, 0) which is the position of the right eye intersects the screen Q of the stereoscopic display monitor 6. In this case, when the angle which the sight line direction of the driver's right eye forms with the normal direction of the screen Q is expressed as θ1, the coordinates of the point pr are shown by (xr−Z0 tan θ1, yr cos α, Z0).

Similarly, left-eye image data Pic_L(x, y) of the planar map are expressed by a set of points pl at each of which an extension (vector Vl) of a straight line which connects between a point p(x, y, Z0−y sin θ) on the virtual map display surface P and the point Ol(xl, yl, 0) which is the position of the left eye intersects the screen Q of the stereoscopic display monitor 6. In this case, when the angle which the sight line direction of the driver's left eye forms with the normal direction of the screen Q is expressed as θ2, the coordinates of the point pl are shown by (xl−Z0 tan θ2, yl cos α, Z0).

A screen composition processing unit 4 calculates the points pr and pl in such a way that the distance between the virtual map display surface P and the position of the driver's right and left eyes is equal to (Z0+y sin α) by using the planar map data Pic_plane and the parameters Z0 and d to generate right-eye image data Pic_R(x, y) and left-eye image data Pic_L(x, y), and outputs the right-eye image data Pic_R(x, y) and the left-eye image data Pic_L(x, y) to a video image playback device 5.

The video image playback device 5 plays back the right-eye image data Pic_R(x, y) and the left-eye image data Pic_L(x, y) which are generated by the screen composition processing unit 4, and outputs them to a stereoscopic display monitor 6. The stereoscopic display monitor 6 displays the planar map in a stereoscopic manner by using the right-eye image data Pic_R(x, y) and the left-eye image data Pic_L(x, y) which are played back by the video image playback device 5.

Figure 27:
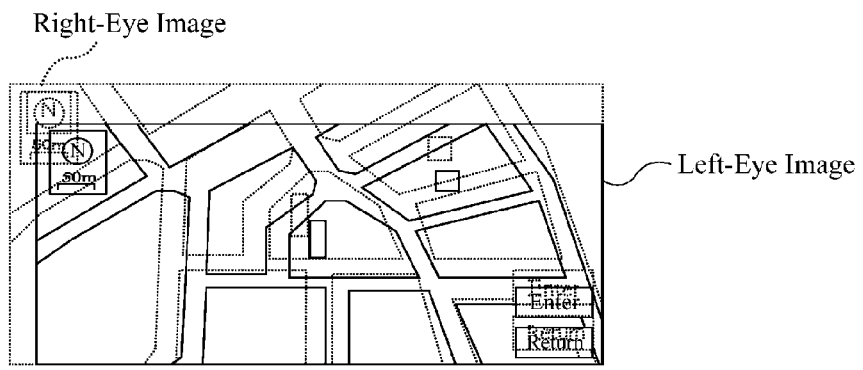
FIG. 27 is a view showing an example of a stereoscopic display produced by a 3Dimension stereoscopic display device in accordance with Embodiment 5.

FIG. 27 is a view showing an example of a stereoscopic display produced by the 3Dimension stereoscopic display device in accordance with Embodiment 5. Because the 3Dimension stereoscopic display device makes the virtual map display surface P of the planar map be further away from the screen Q of the stereoscopic display monitor 6 with increasing distance from the lower side to the upper side of the virtual map display surface by performing the above-mentioned screen compositing process, the gap between the left-eye image and the right-eye image becomes large with increasing distance from the lower side to the upper side of the virtual map display surface, as shown in FIG. 27. At this time, the 3Dimension stereoscopic display device displays the planar map on the screen of the stereoscopic display monitor 6 by using stereoscopic vision in such a way that the planer map looks as if it is floating closer to the driver with increasing distance from the lower side to the upper side of the planar map and the entire planar map is tilted in a vertical direction.

As mentioned above, because the screen composition processing unit 4 in accordance with this Embodiment 5 generates a right-eye image or video image and a left-eye image or video image for three-dimensional stereoscopic display in which a virtual map display surface P on which a planar map which is a display object is displayed in a three-dimensional stereoscopic manner is tilted by an angle of elevation, the 3Dimension stereoscopic display device can produce a stereoscopic display according to the direction of the viewer's line of sight. For example, the display of the in-vehicle information system is mounted while being tilted in many cases. In this case, the 3Dimension stereoscopic display device in accordance with this embodiment can make the information displayed on the screen legible by changing the angle of elevation of the virtual display screen to make this virtual display screen face the direction of the viewer's line of sight.

Further, the structure in accordance with above-mentioned Embodiment 5 can be combined with that in accordance with above-mentioned Embodiment 4. More specifically, both the angle of elevation α of the virtual display surface and the horizontal turning angle θ at which the virtual display surface is turned in a rightward or leftward direction can be changed to be able to make the display screen face the sight line direction of the viewer watching the screen with flexibility, and therefore make the information displayed on the screen still more legible. The 3Dimension stereoscopic display device can adjust the angle of elevation α, the turning angle θ, and the distance z between the virtual display surface and the position of the viewer's eyes from the position of the seat in which the viewer watching the information displayed on the screen is sitting.

Embodiment 6

In above-mentioned Embodiments 1 to 5, the case in which the screen compositing process is implemented through the software processing carried out by the main CPU 4a. In this Embodiment 6, a structure for carrying out the screen compositing process at a high speed by using hardware logic will be described.

Figure 28:
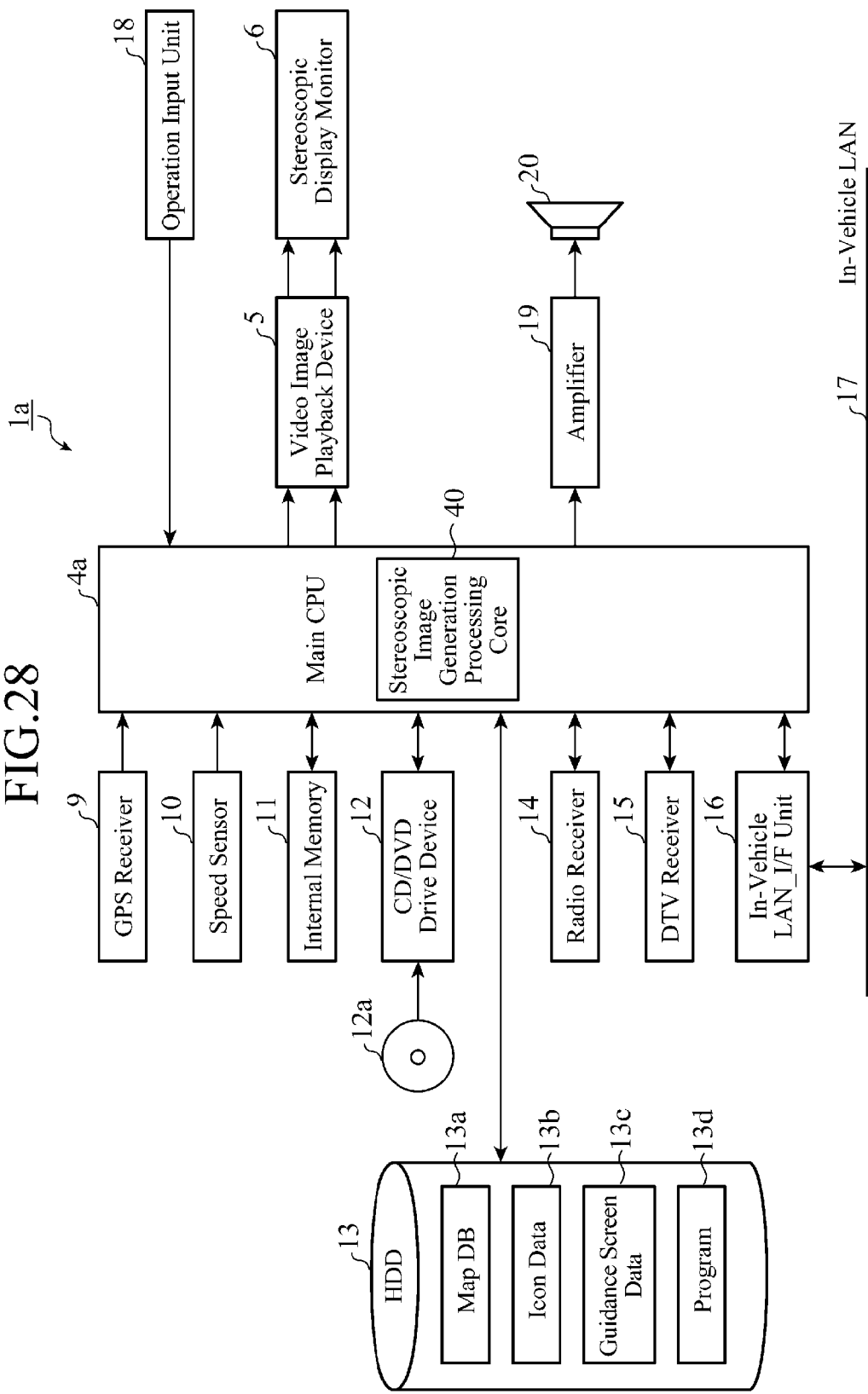
FIG. 28 is a block diagram showing the structure of an in-vehicle information system which uses the 3Dimension stereoscopic display device in accordance with Embodiment 6 of the present invention.

FIG. 28 is a block diagram showing the structure of an in-vehicle information system which uses a 3Dimension stereoscopic display device in accordance with Embodiment 6 of the present invention. Referring to FIG. 28, the in-vehicle information system 1a differs from that having the structure of FIG. 3 shown in above-mentioned Embodiment 1 in that a stereoscopic image generation processing core 40 for carrying out a screen compositing process at a high speed by using hardware logic is formed on the same LSI as that disposed in a main CPU 4a. Instead of forming the stereoscopic image generation processing core on the same LSI, only the hardware logic for carrying out the screen compositing process can be formed as a dedicated LSI, and this dedicated LSI can be constructed as the stereoscopic image generation processing core 40 and connected to the main CPU 4a.

Figure 29:
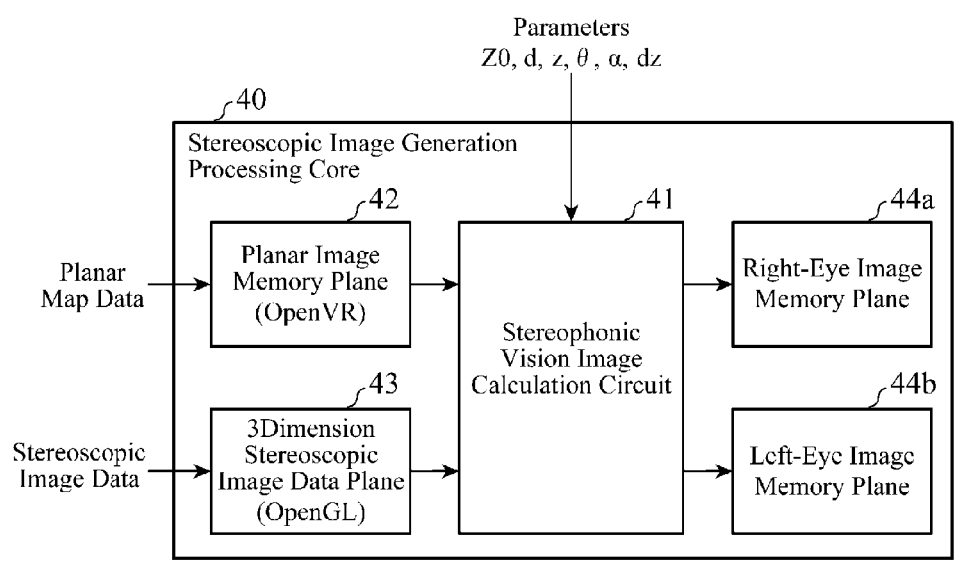
FIG. 29 is a block diagram showing the structure of a stereoscopic image generation processing core.

FIG. 29 is a block diagram showing the structure of the stereoscopic image generation processing core. Referring to FIG. 29, the stereoscopic image generation processing core 40 is provided with a stereoscopic vision image calculation circuit 41, a planar image memory plane 42, a 3Dimension stereoscopic image data plane 43, a right-eye image memory plane 44a, and a left-eye image memory plane 44b. The planar image memory plane 42 receives and stores planar image data showing a planar image which is information to be displayed. In this case, the planar image memory plane receives planar map data from a map DB 13a in an HDD 13.

The 3Dimension stereoscopic image data plane 43 is a memory plane for receiving and storing stereoscopic image data showing a stereoscopic image which is information to be displayed. For example, the 3Dimension stereoscopic image data plane receives stereoscopic image data about icons or a route guidance screen from icon data 13b or guidance screen data 13c in the HDD 13. The stereoscopic vision image calculation circuit 41 receives the planar map data from the planar image memory plane 42, the stereoscopic image data from the 3Dimension stereoscopic image data plane 43, parameters $Z0$, $d$, $z$, $\theta$, $\alpha$, and $dz$ from an internal memory 11 and so on, and carries out the same screen compositing process as that shown in either one of above-mentioned Embodiments 1 to 5 by using these data.

The right-eye image memory plane 44a receives and stores right-eye image data acquired as the result of the screen compositing process carried out by the stereoscopic vision image calculation circuit 41. Further, the left-eye image memory plane 44b receives and stores the left-eye image data acquired as the result of the screen compositing process carried out by the stereoscopic vision image calculation circuit 41. The right-eye image memory plane 44a and the left-eye image memory plane 44b output right-eye image data and left-eye image data to a video image playback device 5 at a predetermined time.

Further, in the stereoscopic image generation processing core 40, an input unit for inputting vehicle information to the stereoscopic image generation processing core can be disposed, and the stereoscopic vision image calculation circuit 41 can specify either a three-dimensional stereoscopic display or a three-dimensional image for planar display according to the descriptions of the vehicle information. For example, the input unit inputs the vehicle speed of the vehicle to the stereoscopic image generation processing core as the vehicle information, the stereoscopic vision image calculation circuit selects a three-dimensional stereoscopic display which looks as if ground objects and so on are floating above a map when the vehicle is at rest, or selects a three-dimensional image for planar display in which ground objects and so on are described on a planar map in a stereoscopic manner when the vehicle is traveling.

As the planar image data stored in the planar image memory plane 42, an expression in a two-dimensional drawing library, such as OpenVR, can be used. Further, as the stereoscopic image data stored in the 3Dimension stereoscopic image data plane 43, an expression in a three-dimensional drawing library, such as OpenGL, can be used. Because these expressions in the libraries are standard I/Fs, the convenience of the stereoscopic image generation processing core 40 can be improved.

As mentioned above, because the 3Dimension stereoscopic display device in accordance with this Embodiment 6 includes the stereoscopic image generation processing core 40 which is a dedicated LSI for carrying out the screen compositing process by using hardware logic, the 3Dimension stereoscopic display device can carry out the image compositing process at a high speed.

Further, although the case in which a planar map is displayed in a stereoscopic manner is shown in above-mentioned Embodiments 1 to 6, the present invention can also be applied to a display of information, such as a menu screen for an AV system, vehicle information, or safety information, as long as the information is typical information displayed on the in-vehicle information system. For example, the present invention can be used for a display of an icon for control of an air conditioner, a meter panel in the dashboard, information about the fuel efficiency of the vehicle, preventive safety information, VICS (registered trademark) information, or the like.

In addition, although the case in which a stereoscopic display which is viewed stereoscopically with the naked eye is produced is shown in above-mentioned Embodiments 1 to 6, the present invention can also use a stereoscopic display method of providing a stereoscopic image by using a polarization eyeglass.

Further, although the case in which the 3Dimension stereoscopic display device in accordance with the present invention is applied to an in-vehicle information system is shown in above-mentioned Embodiments 1 to 6, the 3Dimension stereoscopic display device in accordance with the present invention can be applied to any display device having such a stereoscopic display monitor as above mentioned. For example, the 3Dimension stereoscopic display device in accordance with the present invention can be applied to not only an in-vehicle navigation device, but also an RSE (Rear Seat Entertainment) display device, a television set for home use, and a display for use in a mobile telephone terminal or a mobile information terminal (PDA; Personal Digital Assistance). Further, the 3Dimension stereoscopic display device in accordance with the present invention can be applied to a display device, such as a PND (Portable Navigation Device) which a person carries onto a moving object, such as a car, a railroad, a ship, or an airplane, to use it.

Figure 30:
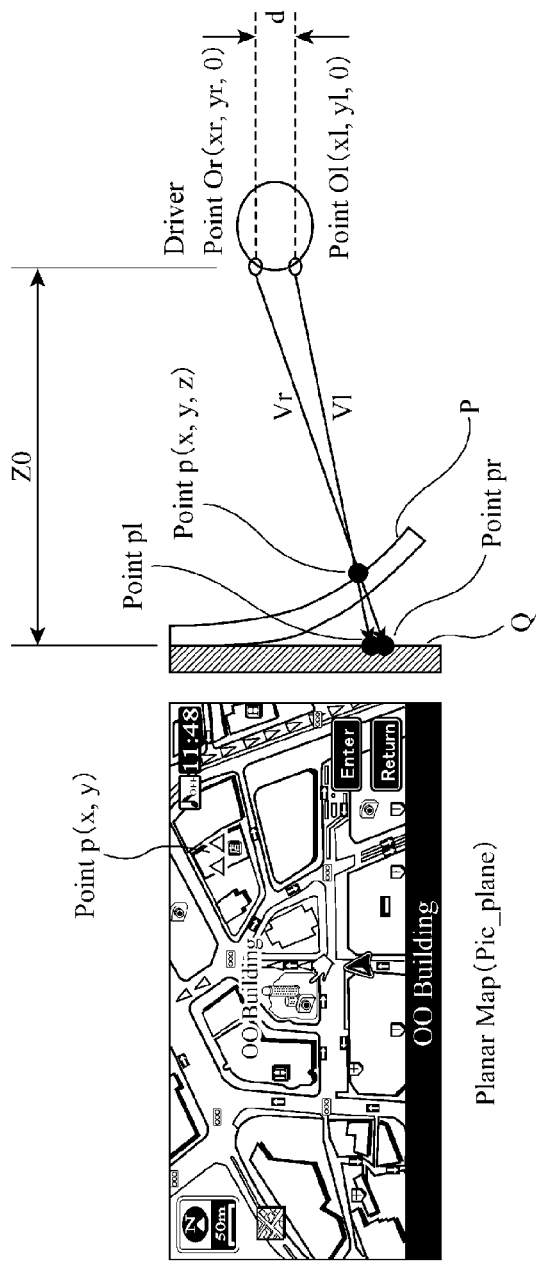
FIG. 30 is a view for explaining a screen compositing process of producing a virtual curved map display surface of a planar map.
Figure 31:
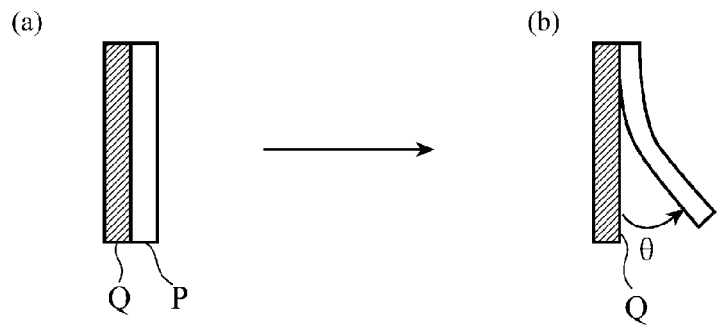
FIG. 31 is a view schematically showing the details of the screen compositing process shown in FIG. 30.

In addition, although the case in which the virtual map display surface P of a planar map is a planar surface is shown in above-mentioned Embodiments 1 to 6, the map display surface P can be a curved surface. FIG. 30 is a view for explaining a screen compositing process of displaying the virtual map display surface P of a planar map in such a way that the surface is curved. FIG. 31 is a view schematically showing the details of the screen compositing process of FIG. 30. In the example shown in FIG. 30, by bending the virtual map display surface P of the planar map in a state ($z=Z0$) in which the distance $Z0$ from the position of the driver's eyes to the virtual map display surface P of the planar map is the same as that from the position of the driver's eyes to the screen Q of the stereoscopic display monitor 6, as shown in FIG. 31(a), the 3Dimension stereoscopic display device enters a state as shown in FIG. 31(b) in which the virtual map display surface is curved. More specifically, as the virtual map display surface P of the planar map, a curved surface which forms an arc extending from the screen Q of the stereoscopic display monitor 6 is provided. In this case, the visibility and designability of the planar map can be improved.

While the invention has been described in its preferred embodiments, it is to be understood that an arbitrary combination of two or more of the above-mentioned embodiments can be made, various changes can be made in an arbitrary component in accordance with any one of the above-mentioned embodiments, or an arbitrary component in accordance with any one of the above-mentioned embodiments can be omitted within the scope of the invention.

INDUSTRIAL APPLICABILITY

Because the 3Dimension stereoscopic display device in accordance with the present invention can improve the visibility of a 3Dimension stereoscopic image or a 3Dimension stereoscopic movie, the 3Dimension stereoscopic display device is suitable for use in a display device disposed in an in-vehicle information system.

The invention claimed is:

1. A 3Dimension stereoscopic display device comprising:
    a playback processor to playback a right-eye image or right-eye video image, and a left-eye image or left-eye video image for three-dimensional stereoscopic display of an inputted image or video image which is a display object which is a planar image or an image in which a stereoscopic image is displayed on a planar image;
    a stereoscopic display monitor to produce a three-dimensional stereoscopic display of the right-eye image or right-eye video image, and the left-eye image or left-eye video image for three-dimensional stereoscopic display of the inputted image or video image which is the display object, which are played back by said playback processor; and
    a screen composition processor to generate said right-eye image or right-eye video image, and said left-eye image or left-eye video image for three-dimensional stereoscopic display in which a virtual display surface for three-dimensional stereoscopic display of said image or video image which is the display object differs from a screen of said stereoscopic display monitor, and for outputting said right-eye image or right-eye video image, and said left-eye image or left-eye video image to said playback processor,
    wherein said screen composition processor generates the right-eye image or right-eye video image, and the left-eye image or left-eye video image for three-dimensional stereoscopic display in which the virtual display surface for three-dimensional stereoscopic display of said inputted image or video image which is the display object is set to be placed at a position forward or backward with respect to the screen of said stereoscopic display monitor according to whether an object carrying said 3Dimension stereoscopic display device is traveling or at rest.

2. The 3Dimension stereoscopic display device according to claim 1, wherein when said inputted image which is the display object is a planar map and an icon image which is displayed together with the planar map, said screen composition processor generates the right-eye image or right-eye video image, and the left-eye image or left-image video image for three-dimensional stereoscopic display in which a virtual display surface for three-dimensional stereoscopic display of said planar map, a virtual display surface for three-dimensional stereoscopic display of said icon image, and the screen of said stereoscopic display monitor differ from one another.

3. The 3Dimension stereoscopic display device according to claim 1, wherein when said image which is the display object is a planar image and an icon image which is displayed on said planar image, said screen composition processor generates the right-eye image or right-eye video image, and the left-eye image or left-eye video image for three-dimensional stereoscopic display in which a virtual display surface for three-dimensional stereoscopic display of said planar image, a virtual display surface for three-dimensional stereoscopic display of said icon image, and the screen of said stereoscopic display monitor differ from one another.

4. The 3Dimension stereoscopic display device according to claim 3, wherein said screen composition processor generates the right-eye image or right-eye video image, and the left-eye image or left-eye video image for three-dimensional stereoscopic display in which the virtual display surface for three-dimensional stereoscopic display of said icon image is set to be placed at a position forward with respect to the virtual display surface for three-dimensional stereoscopic display of said planar image.

5. The 3Dimension stereoscopic display device according to claim 4, wherein said screen composition processor generates the right-eye image or right-eye video image, and the left-eye image or left-eye video image for three-dimensional stereoscopic display in which the virtual display surface for three-dimensional stereoscopic display of said icon image is set to be placed at a position forward with respect to the virtual display surface for three-dimensional stereoscopic display of said planar image according to types of icons.

6. The 3Dimension stereoscopic display device according to claim 1, wherein said screen composition processor generates the right-eye image or right-eye video image, and the left-eye image or left-eye video image for three-dimensional stereoscopic display in which the virtual display surface for three-dimensional stereoscopic display of said inputted image or video image which is the display object is adjusted to a position forward or backward with respect to the screen of said stereoscopic display monitor according to a setting made by a user.

7. The 3Dimension stereoscopic display device according to claim 1, wherein when said image which is the display object is a planar image and an icon image which is displayed on said planar image, said screen composition processor generates the right-eye image or right-eye video image, and the left-eye image or left-eye video image for three-dimensional stereoscopic display in which a virtual display surface for three-dimensional stereoscopic display of said icon image is adjusted to a position forward or backward with respect to the screen of said stereoscopic display monitor according to a setting made by a user.

8. The 3Dimension stereoscopic display device according to claim 1, wherein said screen composition processor generates the right-eye image or right-eye video image, and the left-eye image or left-eye video image for three-dimensional stereoscopic display in which the virtual display surface for three-dimensional stereoscopic display of said inputted image or video image which is the display object is tilted in a vertical direction.

9. A 3Dimension stereoscopic display device comprising:
    a playback processor to playback a right-eye image or right-eye video, image and a left-eye image or left-eye video image for three-dimensional stereoscopic display of an inputted image or video image which is a display object;
    a stereoscopic display monitor to produce a three-dimensional stereoscopic display of the right-eye image or right-eye video image, and the left-eye image or left-eye video image for three-dimensional stereoscopic display of the inputted image or video image which is the display object, which are played back by said playback processor; and
    a screen composition processor to generate said right-eye image or right-eye video image, and said left-eye image or left-eye video image for three-dimensional stereoscopic display in which a virtual display surface for three-dimensional stereoscopic display of said image or video image which is the display object differs from a screen of said stereoscopic display monitor, and for outputting said right-eye image or right-eye video image, and said left-eye image or left-eye video image to said playback processor,
    wherein said screen composition processor generates the right-eye image or right-eye video image, and the left-eye image or left-eye video image for three-dimensional stereoscopic display in which the virtual display surface for three-dimensional stereoscopic display of said inputted image or video image which is the display object is moved forward or backward with respect to the screen of said stereoscopic display monitor according to a traveling speed of a moving object carrying said 3Dimension stereoscopic display device.

10. The 3Dimension stereoscopic display device according to claim 9, wherein when said moving object carrying said 3Dimension stereoscopic display device is traveling, said screen composition processor generates the right-eye image or right-eye video image, and the left-eye image or left-eye video image for three-dimensional stereoscopic display in which the virtual display surface for three-dimensional stereoscopic display of said inputted image or video image which is the display object is set to be placed at a position backward with respect to the screen of said stereoscopic display monitor, whereas when said moving object is at rest, said screen composition processor generates the right-eye image or right-eye video image, and the left-eye image or left-eye video image for three-dimensional stereoscopic display in which the virtual display surface for three-dimensional stereoscopic display of said inputted image or video image which is the display object is set to be placed at a position forward with respect to or at a same position as the screen of said stereoscopic display monitor.

11. A 3Dimension stereoscopic display device comprising:
a playback processor to playback a right-eye image or right-eye video image, and a left-eye image or left-eye video image for three-dimensional stereoscopic display of an inputted image or video image which is a display object;
a stereoscopic display monitor to produce a three-dimensional stereoscopic display of the right-eye image or right-eye video image, and the left-eye image or left-eye video image for three-dimensional stereoscopic display of the inputted image or video image which is the display object, which are played back by said playback processor; and
a screen composition processor to generate said right-eye image or right-eye video image, and said left-eye image or left-eye video image for three-dimensional stereoscopic display in which a virtual display surface for three-dimensional stereoscopic display of said inputted image or video image which is the display object differs from a screen of said stereoscopic display monitor, and for outputting said right-eye image or right-eye video image, and said left-eye image or left-eye video image to said playback processor,
wherein said screen composition processor generates the right-eye image or right-eye video image, and the left-eye image or left-eye video image for three-dimensional stereoscopic display in which the virtual display surface for three-dimensional stereoscopic display of said inputted image or video image which is the display object is turned or tilted by a predetermined angle in a predetermined direction,
the right-eye image or right-eye video image, and the left-eye image or left-eye video image for three-dimensional stereoscopic display in which the virtual display surface for three-dimensional stereoscopic display of said inputted image or video image which is the display object is changed to a predetermined curved shape, or the right-eye image or right-eye video image, and the left-eye image or left-eye video image for three-dimensional stereoscopic display in which the virtual display surface for three-dimensional stereoscopic display of said inputted image or video image which is the display object is subjected to at least two of said process of turning or tilting said virtual display surface by said predetermined angle, said process of changing said virtual display surface to the predetermined curved shape, and a process of moving said virtual display surface forward or backward with respect to the screen of said stereoscopic display monitor.

12. The 3Dimension stereoscopic display device according to claim 11, wherein said screen composition processor generates the right-eye image or right-eye video image, and the left-eye image or left-eye video image for three-dimensional stereoscopic display in which the virtual display surface for three-dimensional stereoscopic display of said image or video image which is the display object is turned in a horizontal direction.

13. The 3Dimension stereoscopic display device according to claim 11, wherein said screen composition processor generates the right-eye image or right-eye video image, and the left-eye image or left-eye video image for three-dimensional stereoscopic display in which the virtual display surface for three-dimensional stereoscopic display of said inputted image or video image which is the display object is changed to a curved surface.

14. The 3Dimension stereoscopic display device according to claim 11, wherein said screen composition processor generates the right-eye image or right-eye video image, and the left-eye image or left-eye video image for three-dimensional stereoscopic display in which the virtual display surface for three-dimensional stereoscopic display of said inputted image or video image which is the display object is adjusted to have a turning angle or tilt in a predetermined direction or to a position forward or backward with respect to the screen of said stereoscopic display monitor according to a setting made by a user.

15. A 3Dimension stereoscopic display device comprising:
a playback processor to playback a right-eye image or right-eye video image, and a left-eye image or left-eye video image for three-dimensional stereoscopic display of an inputted image or video image which is a display object;
a stereoscopic display monitor to produce a three-dimensional stereoscopic display of the right-eye image or right-eye video image, and the left-eye image or left-eye video image for three-dimensional stereoscopic display of the inputted image or video image which is the display object, which are played back by said playback processor; and
a screen composition processor to generate said right-eye image or right-eye video image, and said left-eye image or left-eye video image for three-dimensional stereoscopic display in which a virtual display surface for three-dimensional stereoscopic display of said inputted image or video image which is the display object differs from a screen of said stereoscopic display monitor, and for outputting said right-eye image or right-eye video image, and said left-eye image or left-eye video image to said playback processor,
wherein said screen composition processor generates the right-eye image or right-eye video image, and the left-eye image or left-eye video image for three-dimensional stereoscopic display in which the virtual display surface for three-dimensional stereoscopic display of said image or video image which is the display object is turned or tilted by a predetermined angle in a predetermined direction, the right-eye image or right-eye video image, and the left-eye image or left-eye video image for three-dimensional stereoscopic display in which the virtual display surface for three-dimensional stereoscopic display of said image or video image which is the display object is changed to a predetermined curved shape, or the right-eye image or right-eye video image, and the left-eye image or left-eye video image for three-dimensional stereoscopic display in which the virtual display surface for three-dimensional stereoscopic display of said inputted image or video image which is the display object is subjected to at least two of said process of turning or tilting said virtual display surface by said predetermined angle, said process of changing said virtual display surface to the predetermined curved shape, and a process of moving said virtual display surface forward or backward with respect to the screen of said stereoscopic display monitor, wherein said 3Dimension stereoscopic display device includes a detecting unit for detecting whether an operator is either a driver or a passenger in a seat next to the driver in a vehicle carrying said 3 Dimension stereoscopic display device, and said screen composition processor generates the right-eye image or right-eye video image, and the left-eye image or left-eye video image for three-dimensional stereoscopic display in which the virtual display surface for three-dimensional stereoscopic display of said inputted image or video image which is the display object is turned or tilted in such a way as to face said driver or said passenger according to a result of the detection of whether the operator is either said driver or said passenger.

\* \* \* \* \*